United States Patent
Nomura et al.

(10) Patent No.: US 10,354,799 B2
(45) Date of Patent: Jul. 16, 2019

(54) DIELECTRIC COMPOSITION, DIELECTRIC ELEMENT, ELECTRONIC DEVICE, AND MULTILAYER ELECTRONIC DEVICE

(71) Applicant: TDK CORPORATION, Tokyo (JP)

(72) Inventors: Ryota Nomura, Tokyo (JP); Hiroki Akiba, Tokyo (JP); Sanshiro Aman, Tokyo (JP); Tetsuhiro Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/900,084

(22) Filed: Feb. 20, 2018

(65) Prior Publication Data

US 2018/0240594 A1    Aug. 23, 2018

(30) Foreign Application Priority Data

Feb. 23, 2017 (JP) .................................. 2017-032394
Dec. 5, 2017 (JP) .................................. 2017-233843

(51) Int. Cl.
*H01G 4/12* (2006.01)
*C04B 35/49* (2006.01)
(Continued)

(52) U.S. Cl.
CPC ......... *H01G 4/1227* (2013.01); *C04B 35/465* (2013.01); *C04B 35/4686* (2013.01); *C04B 35/47* (2013.01); *C04B 35/49* (2013.01); *C04B 35/495* (2013.01); *C04B 35/6261* (2013.01); *C04B 35/6262* (2013.01); *C04B 35/638* (2013.01); *C04B 35/64* (2013.01); *H01G 4/008* (2013.01); *H01G 4/012* (2013.01); *H01G 4/1236* (2013.01); *H01G 4/30* (2013.01); *C04B 2235/3203* (2013.01);
(Continued)

(58) Field of Classification Search
CPC ...... C04B 35/49; C04B 35/495; H01G 4/1227
See application file for complete search history.

(56) References Cited

U.S. PATENT DOCUMENTS 9,966,190 B2 * 5/2018 Sakurai .................... C04B 35/49
10,059,630 B2 * 8/2018 Sakurai .................... C04B 35/49
(Continued)

FOREIGN PATENT DOCUMENTS

JP    2004076021 A  *  3/2004
JP    2006152425 A  *  6/2006
(Continued)

*Primary Examiner* — Karl E Group
(74) *Attorney, Agent, or Firm* — Oliff PLC (57) ABSTRACT

A dielectric composition comprising a main component expressed by a chemical formula of $(A_{6-x}B_xC_{x+2}D_{8-x}O_{30}, 0 \leq x \leq 5)$, wherein said "A" component is at least one element selected form the group consisting of Ba, Ca, and Sr, said "B" component is at least one element selected from the group consisting of Y, La, Pr, Nd, Sm, Eu, Gd, Tb, Dy, Ho, Er, Tm, Yb, and Lu, said "C" component is at least one element selected from the group consisting of Ti, and Zr, said "D" component is at least one element selected from the group consisting of Nb, and Ta, and said dielectric composition comprises 2.50 mol or more and 20.00 mol or less of an oxide of Ge as a first sub component with respect to 100 mol of said main component.

20 Claims, 1 Drawing Sheet

(51) Int. Cl.
- *C04B 35/495* (2006.01)
- *H01G 4/30* (2006.01)
- *H01G 4/008* (2006.01)
- *H01G 4/012* (2006.01)
- *C04B 35/465* (2006.01)
- *C04B 35/468* (2006.01)
- *C04B 35/47* (2006.01)
- *C04B 35/626* (2006.01)
- *C04B 35/638* (2006.01)
- *C04B 35/64* (2006.01)

(52) U.S. Cl.
CPC ........... *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3232* (2013.01); *C04B 2235/3239* (2013.01); *C04B 2235/3244* (2013.01); *C04B 2235/3251* (2013.01); *C04B 2235/3256* (2013.01); *C04B 2235/3258* (2013.01); *C04B 2235/3262* (2013.01); *C04B 2235/3287* (2013.01); *C04B 2235/3409* (2013.01); *C04B 2235/3418* (2013.01); *C04B 2235/6562* (2013.01); *C04B 2235/6565* (2013.01); *C04B 2235/6567* (2013.01); *C04B 2235/6582* (2013.01)

(56) References Cited

U.S. PATENT DOCUMENTS

| | | |
|---|---|---|
| 2009/0290285 A1 | 11/2009 | Takeda |
| 2010/0085681 A1 | 4/2010 | Takeda |

FOREIGN PATENT DOCUMENTS

| | | |
|---|---|---|
| JP | 2008-162830 A | 7/2008 |
| WO | 2008/102608 A1 | 8/2008 |
| WO | 2008/155945 A1 | 12/2008 |

\* cited by examiner

DIELECTRIC COMPOSITION, DIELECTRIC ELEMENT, ELECTRONIC DEVICE, AND MULTILAYER ELECTRONIC DEVICE

BACKGROUND OF THE INVENTION

1. Field of the Invention

The present invention particularly relates to a dielectric composition, and an electronic device using said dielectric composition as a dielectric layer which are suitable to be used under a high temperature condition such as for an automobile.

2. Description of the Related Art

A multilayer ceramic capacitor is mounted on many electronic devices because of its high reliability and low cost. As a specific electronic device, information devices such as mobile phone or so, household electric appliances, and electronic components for automobile or so may be mentioned. Among these, the multilayer ceramic capacitor used for an automobile needs to be guaranteed for the use under high temperature compared to the multilayer ceramic capacitor used for information devices such as mobile phone or so; and the performance as the capacitor must be highly reliable such that it would rarely deteriorate. As a property necessary for preventing the deterioration of the capacitor performance, when it is used continuously, it is important that the insulation resistance does not deteriorate even when AC voltage is applied for long period of time. That is, it is important to have a high temperature accelerated lifetime (the time required for an initial insulation resistance to decrease by one digit after applying a temperature and voltage).

Particularly, for the multilayer ceramic capacitor for removing a serge voltage mounted to the inverter circuit using SiC or GaN power semiconductor which has been considered to be used under a high temperature range such as 150° C. or higher, a high reliability is demanded in a wide temperature range of −55° C. to 200° C.

The patent document 1 discloses a multilayer ceramic capacitor using a dielectric ceramic composition which exhibits sufficient permittivity, stable capacitance temperature characteristic, and high resistivity p even under a high temperature of 175° C. or so, wherein said dielectric ceramic composition includes a mixed crystal between a perovskite structure based compound and a tungsten-bronze structure based compound expressed by a compositional formula of $(1-a)(K_{1-x}Na_x)(Sr_{1-y-z}Ba_yCa_z)_2Nb_5O_{15}-a(Ba_{1-b}Ca_b)TiO_3$ as a main component, and further includes 0.1 to 40 parts by mol of a sub component with respect to 100 parts by mol of said main component.

The patent document 2 discloses a dielectric ceramic composition including tungsten-bronze type composite oxide expressed by a chemical formula of $(K_{1-x}Na_x)Sr_2Nb_5O_{15}$ (note that, $0 \leq x < 0.2$) as a main component, wherein the dielectric ceramic composition having high resistivity at a room temperature can be obtained by including 0.005 to 20 parts by mol of rare earth elements, and 0.05 to 40 parts by mol of Mn, V, and Li or so as sub components.

The patent document 3 discloses the dielectric ceramic composition having a main component including barium titanate, and sub components including $BaZrO_3$; oxide of Mg; a rare earth element; oxide of Al or so; and Si, Li, Ge, and B; thereby excellent high temperature accelerated lifetime is attained, and the dielectric ceramic composition can be suitably used for the mid-high voltage.

[Patent document 1] WO2008/155945
[Patent document 2] WO2008/102608
[Patent document 3] JP Patent Application Laid Open No. 2008-162830

SUMMARY OF THE INVENTION

The patent document 1 enables to attain good property in regards with the specific resistivity when DC voltage is applied for about 1 minute or so at the high temperature range, however the high temperature accelerated lifetime is insufficient when AC voltage is applied continuously for long period of time. Also, the patent document 2 improves the insulation property at the room temperature by including various sub components, but the high temperature accelerated lifetime at a high temperature range for example at 250° C. is insufficient. Also, by having sub components of Ge or so in a perovskite type barium titanate based material, the patent document 3 attains a high temperature accelerated lifetime when used at 150° C., but because the main component is barium titanate, the specific permittivity attained at the temperature higher than 150° C. is low, and it was difficult to attain desired capacitance.

The present invention is attained in view of such circumstances, and the object is to provide the dielectric composition and the electronic device or so using thereof attaining excellent voltage resistance and specific resistivity, and good high temperature accelerated lifetime at high temperature range.

In order to attain the object mentioned above, the dielectric composition according to the first aspect of the present invention is a dielectric composition comprising a main component expressed by a chemical formula of $(A_{6-x}B_xC_{x+2}D_{8-x}O_{30}, 0 \leq x \leq 5)$, wherein said "A" component is at least one element selected form the group consisting of Ba, Ca, and Sr, said "B" component is at least one element selected from the group consisting of Y, La, Pr, Nd, Sm, Eu, Gd, Tb, Dy, Ho, Er, Tm, Yb, and Lu, said "C" component is at least one element selected from the group consisting of Ti, and Zr, said "D" component is at least one element selected from the group consisting of Nb, and Ta, and said dielectric composition comprises 2.50 mol or more and 20.00 mol or less of an oxide of Ge as a first sub component with respect to 100 mol of said main component.

The dielectric composition according to the first aspect of the present invention has 0.10 mol or more and 20.00 mol or less of oxides of at least one element selected from the group consisting of Mn, Mg, V, W, Mo, Si, Li, B, and Al as a second sub component with respect to 100 mol of said main component.

The dielectric composition according to the second aspect of the present invention is a dielectric composition having crystal grains and a grain boundary occupying between said crystal grains, wherein said crystal grain is expressed by $A_{6-x}B_xC_{x+2}D_{8-x}O_{30}$ ($0 \leq x \leq 5$) as a main component, said "A" component is at least one element selected form the group consisting of Ba, Ca, and Sr, said "B" component is at least one element selected from the group consisting of Y, La, Pr, Nd, Sm, Eu, Gd, Tb, Dy, Ho, Er, Tm, Yb, and Lu, said "C" component is at least one element selected from the group consisting of Ti, and Zr, said "D" component is at least one element selected from the group consisting of Nb, and Ta, said dielectric composition comprises an oxide of Ge as a first sub component, and an oxide of V as a second sub component, and a ratio of said crystal grains substantially including Ge is less than 10% with respect to entire said crystal grains.

The dielectric composition according to the second aspect of the present invention, wherein when an average concentration of Ge in said grain boundary is $C_1$, and an average concentration of Ge in said crystal grains substantially including Ge is $C_2$, then $C_1/C_2$ is 10 or more in terms of a mol ratio.

The dielectric composition according to the third aspect of the present invention has crystal grains and a grain boundary occupying between said crystal grains, wherein said crystal grain is expressed by $A_{6-x}B_xC_{x+2}D_{8-x}O_{30}$ ($0 \leq x \leq 5$) as a main component, said "A" component is at least one element selected form the group consisting of Ba, Ca, and Sr, said "B" component is at least one element selected from the group consisting of Y, La, Pr, Nd, Sm, Eu, Gd, Tb, Dy, Ho, Er, Tm, Yb, and Lu, said "C" component is at least one element selected from the group consisting of Ti, and Zr, said "D" component is at least one element selected from the group consisting of Nb, and Ta, said dielectric composition comprises an oxide of Ge as a first sub component, and an oxide of V as a second sub component, and when an average concentration of Ge in said grain boundary is $C_1$, and an average concentration of Ge in said crystal grains substantially including Ge is $C_2$, then $C_1/C_2$ is 10 or more in terms of a mol ratio.

The dielectric composition according to the third aspect of the present invention preferably has a content of said oxide of V of more than 1.0 mol and 5.0 mol or less in terms of V, and a content of said oxide of Ge is 10.0 mol or more and 17.5 mol or less in terms of Ge, with respect to 100 mol of said main component.

The dielectric composition according to the second and third aspects of the present invention, wherein said dielectric composition preferably includes an oxide of at least one element selected from the group consisting of Mn, Mg, W, Mo, Si, Li, B, and Al in addition to the oxide of V as the second sub component, and the content of oxides other than the oxide of V is 0.10 mol or more and 20.00 mol or less in terms of each element.

The dielectric composition according to the first to third aspects of the present invention, wherein the main component preferably has a tungsten-bronze type crystal structure.

As the dielectric composition satisfies any one of the above mentioned characteristics, the dielectric composition suitable for the use at the high temperature range, having excellent voltage resistance and specific resistivity, and good high temperature accelerated lifetime can be provided.

Further, the electronic devices having the dielectric layer including the dielectric composition as set forth in the above can be used as the electronic devices for the automobile which is used within the range between the low temperature range of −55° C. and 150° C. or so, further it can be used as a snubber capacitor for the power devices using SiC and GaN based semiconductor which is demanded to be used at even higher temperature of 250° C. or so, and it can be used as the capacitor or so for removing the noise in the engine room of the automobile.

The dielectric element according to the present invention includes the dielectric composition as set forth in any one of the above.

The electronic device according to the present invention includes the dielectric layer made of the dielectric composition as set forth in any one of the above.

The multilayer electronic device according to the present invention has a multilayer part wherein an internal electrode and a dielectric layer comprising the dielectric composition as set forth in any one of above are stacked in an alternating manner.

DESCRIPTION OF THE PREFERRED EMBODIMENTS

First Embodiment

Figure 1:
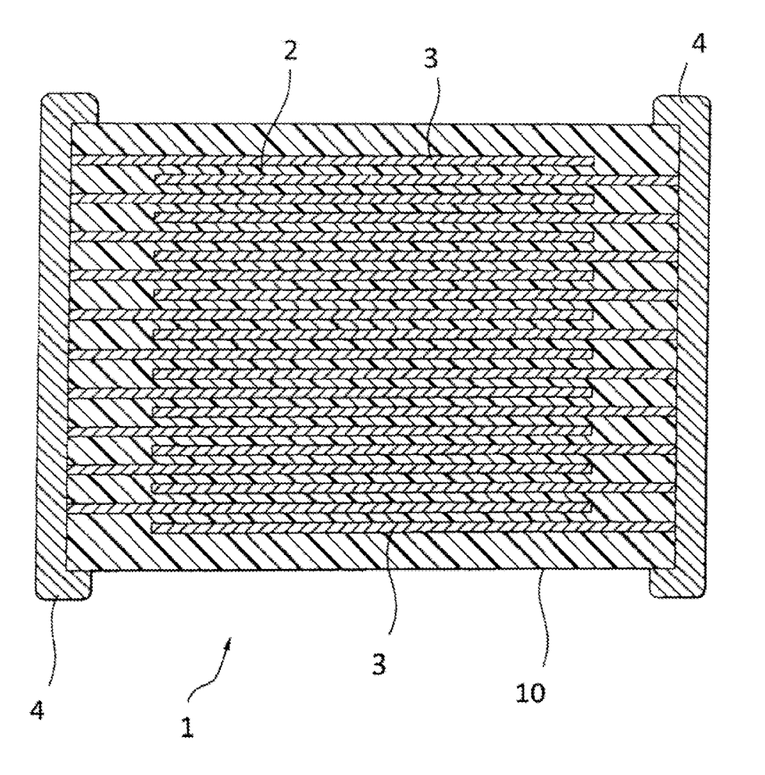
The FIGURE illustrates a cross section of the multilayer ceramic capacitor according to one embodiment of the present invention.

First, as the multilayer electronic device of the present invention, a multilayer ceramic capacitor will be explained. The FIGURE shows a cross section of a general multilayer ceramic capacitor.

The multilayer ceramic capacitor 1 has the capacitor element body 10 wherein a dielectric layer 2 and an internal electrode layer 3 are stacked in an alternating manner. At the both ends of this capacitor element body 10, a pair of external electrodes 4 are formed which respectively conducts with the internal electrode layer 3 placed in an alternating manner in the capacitor element body 10. The shape of this capacitor element body 10 is not particularly limited, but usually it is a rectangular parallelepiped shape. Also, the size thereof is not particularly limited, and it may be a suitable size depending on the use.

The internal electrode layer 3 is stacked in the way that each end part alternatingly exposes to the surface of two opposing end faces of the capacitor element body 10. The pair of external electrodes 4 are formed at both end faces of the capacitor element body 10, and connected with the exposed end of the internal electrode layer which is placed in an alternating manner; thereby the capacitor circuit is formed.

The thickness of the dielectric layer 2 is not particularly limited, but preferably it is 100 μm or less per layer, and more preferably 30 μm or less per layer. The lower limit of the thickness is not particularly limited, and for example it is 0.5 μm or so. According to the dielectric composition of the present invention, even if the thickness of the dielectric layer 2 is between 0.5 and 30 μm, the multilayer ceramic capacitor 1 having the dielectric layer attaining excellent high temperature accelerated lifetime can be formed.

The number of the dielectric layer 2 being stacked is not particularly limited, but preferably it is 20 or more, and more preferably 50 or more.

A conductive material included in the internal electrode layer 3 is not particularly limited, but Ni, Ni based alloy, Cu, or Cu based alloy is preferable. Note that, 0.1 mass % or less of various trace components such as P or so may be included in Ni, Ni based alloy, Cu, or Cu based alloy. Also, the internal electrode layer 3 may be formed using the commercially available electrode paste. The thickness of the internal electrode layer 3 may be determined accordingly based on the use.

More preferably, the conductive material included in the internal electrode layer 3 is Ni or Ni based alloy because the material of the conductive layer 2 is reduction resistant. Even more preferably, this Ni or Ni based alloy is used as the main component, and further the internal electrode sub component of at least one selected from the group consisting of Al, Si, Li, Cr, and Fe is added to the main component.

By adding the internal electrode sub component of at least one selected from the group consisting of Al, Si, Li, Cr, and Fe to Ni or Ni based alloy as the main component of the internal electrode layer 3, the above mentioned internal electrode sub component reacts with oxygen before Ni reacts with oxygen in the atmosphere to form NiO, thereby an oxide coating of the internal electrode sub component is formed to the surface of Ni. Thus, the oxygen in the air must pass through the oxide coating of the internal electrode sub component in order to react with Ni, thus oxidation of Ni becomes difficult. Thereby, in case of using continuously under a high temperature of 250° C., the deterioration of the continuity and conductivity of the internal electrode having Ni as the main component caused by the oxidation will rarely occur.

The conductive material included in the external electrode 4 is not particularly limited, however for the present invention, inexpensive Ni and Cu; and Au, Ag, and Pd having high heat resistance, further the alloy of these can be used. The thickness of the external electrode 4 may be determined accordingly based on the use or so, but usually 10 to 50 μm or so is preferable.

Next, the dielectric composition constituting the dielectric layer according to the present invention will be described in detail.

The dielectric composition according to the present embodiment has the main component shown in below. The main component is expressed by a chemical formula of $(A_{6-x}B_xC_{x+2}D_{8-x}O_{30}, 0 \leq x \leq 5)$, wherein said "A" component is at least one element selected form the group consisting of Ba, Ca, and Sr, said "B" component is at least one element selected from the group consisting of Y, La, Pr, Nd, Sm, Eu, Gd, Tb, Dy, Ho, Er, Tm, Yb, and Lu, said "C" component is at least one element selected from the group consisting of Ti, and Zr, said "D" component is at least one element selected from the group consisting of Nb, and Ta. Hereinafter, each component will be explained.

In the present embodiment, for the main component expressed by a chemical formula of $A_{6-x}B_xC_{x+2}D_{8-x}O_{30}$, the "B" component is at least one element selected from the group consisting of Y, La, Pr, Nd, Sm, Eu, Gd, Tb, Dy, Ho, Er, Tm, Yb, and Lu. As the "B" component is included in the main component, the dielectric composition having excellent high temperature accelerated lifetime and voltage resistance while maintaining high specific permittivity can be obtained.

Also, "x" is a substitution amount of the "B" component, and the range is $0 \leq x \leq 5$, and preferably $0 \leq x \leq 3$. Therefore, in the present embodiment, the "B" component in the main component is an arbitrary component. By having "x" within the above mentioned range, the dielectric composition having excellent high temperature accelerated lifetime can be obtained.

For example, by using $A_6C_2D_8O_{30}$ (when x=0), $A_5B_1C_3D_7O_{30}$ (when x=1), $A_4B_2C_4D_6O_{30}$ (when x=2), or $A_3B_3C_5D_5O_{30}$ (when x=3) as the main component, the dielectric composition having excellent high temperature accelerated lifetime can be obtained.

In the present embodiment, for the main component expressed by the chemical formula of $A_{6-x}B_xC_{x+2}D_{8-x}O_{30}$, the "A" component is at least one element selected form the group consisting of Ba, Ca, and Sr; and the substitution amount thereof is (6−x). In the present embodiment, because "x" satisfies $0 \leq x \leq 5$, the "A" component is always included. By including the "A" component of which the substitution amount is (6−x) in the main component, the dielectric composition having excellent high temperature accelerated lifetime and voltage resistance can be obtained.

In the present embodiment, for the main component expressed by the chemical formula of $A_{6-x}B_xC_{x+2}D_{8-x}O_{30}$, the "C" component is at least one element selected from the group consisting of Ti and Zr, and the substitution amount thereof is (2+x). By including the "C" component in the main component of which the substitution amount is (2+x), the bandgap is widened, and the dielectric composition having excellent voltage resistance and specific permittivity can be obtained.

In the present embodiment, for the main component expressed by the chemical formula of $A_{6-x}B_xC_{x+2}D_{8-x}O_{30}$, the "D" component is at least one element selected from the group consisting of Nb and Ta, and the substitution amount thereof is (8−x). In the present embodiment, because "x" satisfies $0 \leq x \leq 5$, the "D" component is always included. By including the "D" component of which the substitution amount is (8−x) in the main component, the tungsten-bronze type crystal structure is easily maintained, and the dielectric composition having excellent voltage resistance can be obtained.

The dielectric composition according to the present embodiment includes the oxide of Ge as the first sub component. The present inventors have found that by including the oxide of Ge as the first sub component in the dielectric composition, an oxygen defect can be suppressed from moving which is thought to cause the deterioration of the high temperature accelerated lifetime.

In the present embodiment, the content of the oxide of Ge as the first sub component is 2.50 mol or more and 20.00 mol or less, preferably 5.00 mol or more and 18.00 mol or less, and more preferably 10.00 mol or more and 17.50 mol or less with respect to 100 mol of the main component. By having the content of the oxide of Ge as the first sub component within the above mentioned range, the oxygen defect can be suppressed from moving which is thought to cause the deterioration of the high temperature accelerated lifetime, and a sufficient high temperature accelerated lifetime can be obtained.

The dielectric composition according to the present embodiment preferably includes oxides of at least one element selected from the group consisting of Mn, Mg, V, W, Mo, Si, Li, B, and Al as a second sub component. Also, the content of the second sub component is preferably 0.05 mol or more and 30.00 mol or less, more preferably 0.10 mol or more and 20.00 mol or less with respect to 100 mol of the main component. By having the content of the second sub component within the above mentioned range, the voltage resistance and the specific resistivity can be improved even more. Also, the movement of the oxygen defect which is thought to cause the deterioration of the high temperature accelerated lifetime is suppressed, thus the high temperature accelerated lifetime is even more improved.

Note that, the dielectric composition according to the present embodiment may include trace amount of impurity and other sub component as long as these do not significantly compromise the properties such as the specific permittivity, the specific resistivity, the voltage resistance and the high temperature accelerated lifetime or so. For example, the dielectric composition may include Ba, Ni, Cr, Zn, Cu, and Ga or so. The content of the main component with respect to the entire dielectric composition is not particularly limited, but for example it may be 60.0 mol % or more and 97.5 mol % or less with respect to the entire dielectric composition including the main component.

Also, in the dielectric composition according to the present embodiment, preferably, the main component substantially does not include alkaline metals which are highly volatile. By not including the alkaline metals, the dielectric composition will barely have a lattice defect, a conductive electron is rarely formed, and thus a high specific resistivity is attained. Further, an electrolytic reduction reaction is thought to rarely occur under high temperature and high electric field. Therefore, the conductive electron generated by the reduction reaction is suppressed from increasing; hence an excellent high temperature accelerated lifetime is thought to be exhibited. Note that, not substantially including the alkaline metal means for example that the content of the alkaline metal is 1.0 at % or less with respect to the entire elements included in the main component.

For the dielectric composition according to the present embodiment, the main component preferably has the tungsten-bronze type crystal structure. The existence of the tungsten-bronze type crystal structure of the main component can be verified by X-ray diffraction (XRD) pattern of the dielectric composition.

For the present embodiment, when the main component expressed by a chemical formula of $A_{6-x}B_xC_{x+2}D_{8-x}O_{30}$ satisfies $0 \leq x \leq 3$, the main component tends to easily have the tungsten-bronze type crystal structure.

As the main component has the tungsten-bronze type crystal structure, high voltage resistance tends to be easily attained. The present inventors speculate the reason for this as discussed in below. When the main component of the present embodiment has the tungsten-bronze type crystal structure, the bandgap is widened, thus it is difficult for the electron in the valence band to be excited to a conduction band, thus a carrier concentration of the electrons which are the majority carrier relating to the conduction can be suppressed. Also, in regards with an electron avalanche which is the typical breakdown mode of the voltage resistance, the carrier concentration of the conductive electrons as the majority carrier is considered to have an influence. When the main component has the tungsten-bronze type crystal structure, the carrier concentration of this electrons as the majority carrier can be suppressed to low level, thus the breakdown by the electron avalanche is thought to rarely occur. Further, when the bandgap is winded, the bandgap having certain width can be maintained even when high electric filed is applied, thus high voltage resistance can be easily attained even under high electric field.

As such, the dielectric composition according to the present embodiment exhibits good properties even under high temperature range, thus it can be suitably used within the temperature range of the SiC or GaN based power device (for example, −55° C. to 250° C.). Also, it can be suitably used for the electronic device for removing the noise under harsh condition such as the engine room of the automobile or so.

Next, an example of the production method of the multilayer ceramic capacitor shown in the FIGURE will be explained.

The multilayer ceramic capacitor 1 of the present embodiment is produced as similar to the conventional multilayer ceramic capacitor, that is, the green chip is produced by a printing method or a sheet method or so using the paste, then this is calcinated, followed by coating the external electrode and sintering; thereby the multilayer ceramic capacitor 1 of the present embodiment is produced. Hereinafter, the non-limiting example of the production method will be explained.

First, a calcined powder of the main component is prepared. As the starting material, a material powder of oxide which is mainly formed of Sr, Ba, Ca, Ti, Zr, Nb, Ta, and mixture thereof can be used. Also, it can be selected from various compounds which forms the above mentioned oxides and composite oxides by calcinating, such as carbonate, oxalate, nitrate, hydroxides, organometallic compound or so, and then it can be used by mixing these. Specifically, SrO may be used as the material of Sr, and $SrCO_3$ may be used as well. The average particle size of the material powder is preferably 1.0 μm or less. After weighing each component so to satisfy the predetermined composition ratio, a wet mixing is carried out for predetermined time using a ball mill. After drying the obtained mixed powder, a heat treatment at 1000° C. or less is carried out in the air, thereby the calcined powder of the main component is obtained.

The calcined powder of the sub component is prepared. As the material of the sub component, it is not particularly limited, and the oxide of each component and the mixture thereof may be used as the material powder. For example, as the starting material of the first sub component, $GeO_2$ powder having the average particle size of 2.0 μm or less can be used. Also, as the starting material of the second sub component, the oxide of Mn, Mg, Co, V, W, Mo, Si, Li, B, and the mixture thereof can be used as the material powder. Also, the starting material can be selected from various compounds which form the above mentioned oxides and composite oxides by calcinating such as carbonate, oxalate, nitrate, hydroxides, organometallic compound or so, and the starting material can be used by mixing these as well. Specifically, MgO or $MgCO_3$ may be used as the material of Mg. After weighing each component so to satisfy the predetermined composition ratio, a wet mixing is carried out for predetermined time using a ball mill. After drying the obtained mixed powder, the heat treatment is carried out for 1 to 5 hours at 700° C. to 800° C. in the air, thereby the calcined powder of the sub components is obtained. Note that, the mixed powder which is after the drying but before the heat treatment may be used as well.

Then, the calcined powder of the obtained main component, and the calcined powder of the sub components or the mixed powder of the sub components are mixed and ground, thereby the dielectric composition material is obtained. The dielectric composition material is, for example, the mixed powder having the average particle size of 0.5 μm to 2.0 μm.

The dielectric composition material obtained above is made into paste to prepare a dielectric layer paste. The dielectric layer paste may be an organic based paste wherein the dielectric mixed powder and the organic vehicle are kneaded, or it may be a water based paste.

The organic vehicle is obtained by dissolving a binder in an organic solvent. The binder used in the organic vehicle is not particularly limited, and may be properly selected from various usual binders such as ethyl cellulose and polyvinyl butyral or so. Also, the used organic solvent is not particularly limited, and may be properly selected from various organic solvents such as terpineol, butyl carbitol, acetone and toluene or so in accordance with a method used such as a printing method and a sheet method or so.

Also, when using water based dielectric layer paste, dielectric materials can be kneaded with a water-based vehicle obtained by dissolving an aqueous binder and a dispersant or so in water. The aqueous binder used for water based vehicle is not particularly limited, and for example, polyvinyl alcohol, cellulose, aqueous acrylic resin or so may be used.

An internal electrode layer paste is obtained by kneading conductive materials made of the above mentioned various conductive metals and alloys, or various oxides, organometallic compound and resinate or so, which will be the above mentioned conductive materials after calcinating, with the above mentioned organic vehicle.

An external electrode paste may be obtained as same as the above mentioned internal electrode layer paste.

The content of organic vehicle in each of the above mentioned paste is not particularly limited, and may be a usual content, for example, 1 to 5 wt % or so of the binder and 10 to 50 wt % or so of the solvent. Also, in each paste, the additives may be included which are selected from variety of dispersants, plasticizers, dielectrics, insulators or so, if needed. The total contents of these are preferably 10 wt % or less.

When using the printing method, the dielectric layer paste and the internal electrode layer paste are printed on a substrate such as PET or so to form layers, and after cutting to a predetermined shape, the green chip is obtained by being removed from the substrate.

Also, when using the sheet method, a green sheet is formed by using the dielectric layer paste, and the internal electrode layer paste is printed thereon, then these are stacked to form the green chip.

Before sintering, the green chip is subjected to a binder removal treatment. The binder removal conditions are, the temperature increasing rate of preferably 5° C./hour to 300° C./hour, the holding temperature of preferably 180° C. to 500° C., and the temperature holding time of preferably 0.5 hours to 24 hours. Also, the binder removal atmosphere is in the air or reduced atmosphere. During the binder removal treatment, in order to wet $N_2$ gas or mixed gas or so, for example a wetter or so may be used. In this case, the water temperature is preferably 5° C. to 75° C. or so.

The holding temperature at the sintering is preferably 1100° C. to 1400° C. If the holding temperature is below said range, the densification becomes insufficient; and if it exceeds said range, the breakage of the electrode tends to occur due to the abnormal sinter of the internal electrode layer, the deterioration of the capacitance-temperature characteristics tend to occur due to the dispersion of the constitution material of the internal electrode layer. Also, if the holding temperature exceeds the above mentioned range, the crystal grains may become coarse and the high temperature accelerated lifetime may decrease.

The temperature increasing rate is preferably 200° C./hour to 500° C./hour. In order to regulate the size distribution after the sintering to be within the range of 0.5 μm to 5.0 μm, and also to suppress the volume enlargement of the crystal grains, the temperature holding time is preferably 0.5 hours to 2.0 hours, and the temperature decreasing rate is preferably 100° C./hour to 500° C./hour.

Also, as the sintering atmosphere, the mixed gas of wet $N_2$ and $H_2$ is used, and the sintering is preferably carried out under the oxygen partial pressure of $10^{-2}$ to $10^{-6}$ Pa. However, in case the sintering is carried out under the high oxygen partial pressure, if the internal electrode layer includes Ni, Ni is oxidized, and the conductivity of the electrode decreases. In this case, the conductive material having Ni as the main component, which is the more preferable embodiment than the present embodiment, includes at least one of the internal electrode sub components selected from the group consisting of Al, Si, Li, Cr, and Fe, thereby the oxidation resistance of Ni is improved. Thus, even under the atmosphere having high oxygen partial pressure, the conductivity of the internal electrode layer can be secured.

After the sintering, to the obtained capacitor element, the annealing treatment is carried out if necessary. The annealing condition may be a known condition. For example, the oxygen partial pressure during the annealing treatment is higher than the oxygen partial pressure during the sintering, and the holding temperature is preferably 1000° C. or less.

Also, in the above, the production method of independently carrying out the sintering and the annealing treatment is shown, but it may be carried out continuously.

The capacitor element body obtained above is subjected to the end face polishing, for example, by a barrel polishing or sand blast or so, then the external electrode paste is coated and sintering, thereby the external electrode 4 is formed. Then, depending on the needs, a coating layer by plating or so is formed to the surface of the external electrode 4.

Second Embodiment

Hereinafter, the second embodiment of the present invention will be described. For parts not described below, they are the same as the first embodiment.

The dielectric composition according to the present embodiment is the dielectric composition made of the crystal grains and the grain boundary occupying between the crystal grains. The grain boundary mentioned above includes the intergranular boundary which is between two crystal grains, and the multiple junctions which exist between three or more crystal grains. Further, the crystal grains have the main component expressed by the chemical formula of $(A_{6-x}B_xC_{x+2}D_{8-x}O_{30}, 0 \leq x \leq 5)$. Also, unless the object of the present invention is not compromised, somewhat of grains which are formed of deposits other than the main component may be included.

In the dielectric composition according to the present embodiment, Ge is present in high concentration in the grain boundary. As a result, the number ratio of the crystal grain which does not substantially include Ge is 90% or more with respect to the entire crystal grains. That is, the number ratio of the crystal grains substantially including Ge is less than 10%. Note that, "the crystal grain not substantially including Ge" means that the area of the range where Ge exists is 10% or less within the cross section of the crystal grain. That is, in the dielectric composition according to the present embodiment, Ge does not substantially exist in 90% or more of the crystal grains and large part of Ge exists in the grain boundary.

Also, whether the crystal grain substantially includes Ge can be verified using FE-TEM-EDX (Electron transmission microscope-Energy dispersive type X-ray spectroscopy) to the cross section of the crystal grain, that is to the cross section of the dielectric composition including the crystal grain. Also, the condition of EDX of the present embodiment is a probe diameter of 1 nm, and an accelerating voltage of 200 kV. In this case, for the area where Ge is detected, this is defined as the area where Ge exists regardless of the amount of Ge detected. Also, for calculating the number ratio of the crystal grain not substantially including Ge, the area of observation is the area of which the cross section of at least 100 crystal grains can be observed.

Also, when the average concentration of Ge in the grain boundary is $C_1$, and the average concentration of Ge in the crystal grain substantially including Ge is $C_2$, then $C_1/C_2$ is preferably 10 or more in terms of mol ratio, and more preferably it is 20 or more. As $C_1/C_2$ is 10 or more, the oxygen defect which is thought to cause the deterioration of the highly accelerated lifetime can be suppressed from moving due to the high concentration of Ge at the grain boundary. Further, the dielectric composition having high temperature accelerated lifetime tends to be easily provided.

The dielectric composition according to the present embodiment at least has the oxide of Ge as the first sub component, and the oxide of V as the second sub component. By having the oxide of Ge and the oxide of V at the same time, the solid dissolving of Ge to the crystal grain can be suppressed.

In the present embodiment, the content of the oxide of Ge as the first sub component is preferably 10.0 mol or more and 17.5 mol or less in terms of Ge with respect to 100 mol of the above mentioned main component. By having the content of the oxide of Ge as the first sub component within the above mentioned range, the movement of the oxygen defect which is thought to cause the deterioration of the high temperature accelerated lifetime is suppressed, and even more excellent high temperature accelerated lifetime can be easily obtained. Also, the content of the oxide of V as the second sub component is preferably more than 1.00 mol and 5.0 mol or less in terms of V with respect to 100 mol of the above mentioned main component. Thereby, the ratio of the crystal grain which does not substantially include Ge can be increased to 95%, and the average concentration of Ge in the grain boundary can be increased, thus even more excellent high temperature accelerated lifetime can be easily obtained.

The dielectric composition according to the present embodiment preferably further includes the oxide of at least one element selected from the group consisting of Mn, Mg, W, Mo, Si, Li, B, and Al as the second sub component in addition to the oxide of V. Also, the content of second sub component other than the oxide of V is preferably 0.10 mol or more and 20.00 mol or less in terms of each element with respect to 100 mol of the above mentioned main component. By having the content of second sub component other than the oxide of V within the above mentioned range, the voltage resistance and the specific resistivity are more improved. Also, the movement of the oxygen defect which is thought to cause the deterioration of the high temperature accelerated lifetime is suppressed, and high temperature accelerated lifetime is more improved.

Third Embodiment

Hereinafter, the third embodiment of the third invention will be explained. For parts not described below, they are the same as the second embodiment.

For the dielectric composition according to the present embodiment, when the average concentration of Ge in the grain boundary is $C_1$, and the average concentration of Ge in the crystal grain substantially including Ge is $C_2$, then $C_1/C_2$ is preferably 10 or more in terms of mol ratio. Also, more preferably $C_1/C_2$ is 20 or more. As $C_1/C_2$ is 10 or more, the oxygen defect which is thought to cause the deterioration of the high temperature accelerated lifetime can be suppressed from moving due to the high concentration of Ge at the grain boundary. Further, the dielectric composition having high temperature accelerated lifetime tends to be easily provided.

Also, for the dielectric composition according to the present embodiment, the number ratio of the crystal grain which does not substantially include Ge is preferably 90% or more with respect to the entire crystal grains.

Hereinabove, the embodiments of the present invention have been described, but the present invention is not to be limited thereto, and it may be variously modified within the scope of the present invention.

EXAMPLE

Hereinafter, the present invention will be described in details by referring to specific examples, but the present invention is not to be limited thereto. Note that, the samples indicated with "*" in Tables 1 to 4 are out of the range of the present invention.

Example 1

As the starting material of the main component, each powder of $SrCO_3$, $BaCO_3$, $CaCO_3$, $TiO_2$, $ZrO_2$, $Nb_2O_5$, $Ta_2O_5$, $Y_2O_3$, $La_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$ having the average particle size of 1.0 μm or less were prepared. These were weighed so to satisfy the main component composition of each sample shown in Table 1, and using ethanol as the dispersing medium, a wet mixing was carried out with a ball mill for 24 hours. The obtained mixtures were dried, and then the heat treatment was carried out under the condition of the holding temperature of 900° C. and the holding time of 2 hours in the air. Thereby, the calcination powder of the main component was obtained.

The powder of $GeO_2$ as the starting material of the first sub component, each powder of MnO, MgO, $V_2O_5$, $WO_3$, $MoO_3$, $SiO_2$, $Li_2CO_3$, $B_2O_3$, and $Al_2O_3$ as the starting material of the second sub component were prepared. These were weighed so to satisfy the blending ratio shown in Table 1, and using ethanol as the dispersing medium, a wet mixing was carried out with a ball mill for 24 hours. The obtained mixtures were dried, and then the heat treatment was carried out under the condition of the holding temperature of 800° C. and the holding time of 2 hours in the air. Thereby, the calcination powder of the sub component was obtained.

TABLE 1

| | Main component [mol %] | | | | | | | | First sub component [mol %] |
|---|---|---|---|---|---|---|---|---|---|
| | | A | | | | C | | D | |
| | x | Sr | Ba | Ca | B | Ti | Zr | Nb | Ta | Ge |
| Sample No. 1 | 2.00 | 0.00 | 1.00 | 0.00 | La | 0.70 | 0.30 | 1.00 | 0.00 | 5.00 |
| Sample No. 2 | 2.00 | 0.30 | 0.70 | 0.00 | La | 0.70 | 0.30 | 1.00 | 0.00 | 5.00 |
| *Sample No. 3 | 2.00 | 0.50 | 0.50 | 0.00 | La | 0.70 | 0.30 | 1.00 | 0.00 | 0.00 |
| *Sample No. 4 | 2.00 | 0.50 | 0.50 | 0.00 | La | 0.70 | 0.30 | 1.00 | 0.00 | 2.00 |
| Sample No. 5 | 2.00 | 0.50 | 0.50 | 0.00 | La | 0.70 | 0.30 | 1.00 | 0.00 | 2.50 |

TABLE 1-continued

| Sample | | | | | | | | | | |
|---|---|---|---|---|---|---|---|---|---|---|
| Sample No. 6 | 2.00 | 0.50 | 0.50 | 0.00 | La | 0.70 | 0.30 | 1.00 | 0.00 | 5.00 |
| Sample No. 7 | 2.00 | 0.50 | 0.50 | 0.00 | La | 0.70 | 0.30 | 1.00 | 0.00 | 10.00 |
| Sample No. 8 | 2.00 | 0.50 | 0.50 | 0.00 | La | 0.70 | 0.30 | 1.00 | 0.00 | 15.00 |
| Sample No. 9 | 2.00 | 0.50 | 0.50 | 0.00 | La | 0.70 | 0.30 | 1.00 | 0.00 | 17.50 |
| Sample No. 10 | 2.00 | 0.50 | 0.50 | 0.00 | La | 0.70 | 0.30 | 1.00 | 0.00 | 20.00 |
| *Sample No. 11 | 2.00 | 0.50 | 0.50 | 0.00 | La | 0.70 | 0.30 | 1.00 | 0.00 | 25.00 |
| Sample No. 12 | 2.00 | 0.00 | 0.70 | 0.30 | La | 0.70 | 0.30 | 1.00 | 0.00 | 5.00 |
| Sample No. 13 | 2.00 | 0.20 | 0.50 | 0.30 | La | 0.70 | 0.30 | 1.00 | 0.00 | 5.00 |
| Sample No. 14 | 2.00 | 0.30 | 0.40 | 0.30 | La | 0.70 | 0.30 | 1.00 | 0.00 | 12.50 |
| Sample No. 15 | 2.00 | 0.60 | 0.40 | 0.00 | La | 0.70 | 0.30 | 1.00 | 0.00 | 5.00 |
| Sample No. 16 | 2.00 | 0.10 | 0.50 | 0.40 | La | 0.70 | 0.30 | 1.00 | 0.00 | 5.00 |
| Sample No. 17 | 2.00 | 0.00 | 0.50 | 0.50 | La | 0.70 | 0.30 | 1.00 | 0.00 | 5.00 |
| Sample No. 18 | 2.00 | 0.00 | 0.40 | 0.60 | La | 0.70 | 0.30 | 1.00 | 0.00 | 5.00 |
| Sample No. 19 | 0.00 | 0.00 | 1.00 | 0.00 | La | 0.70 | 0.30 | 1.00 | 0.00 | 5.00 |
| Sample No. 20 | 0.10 | 0.00 | 1.00 | 0.00 | La | 0.70 | 0.30 | 1.00 | 0.00 | 10.00 |
| Sample No. 21 | 0.50 | 0.00 | 1.00 | 0.00 | La | 0.70 | 0.30 | 1.00 | 0.00 | 5.00 |
| Sample No. 22 | 1.00 | 0.00 | 1.00 | 0.00 | La | 0.70 | 0.30 | 1.00 | 0.00 | 5.00 |
| Sample No. 23 | 3.00 | 0.00 | 1.00 | 0.00 | La | 0.70 | 0.30 | 1.00 | 0.00 | 5.00 |
| Sample No. 24 | 4.00 | 0.00 | 1.00 | 0.00 | La | 0.70 | 0.30 | 1.00 | 0.00 | 17.50 |
| Sample No. 25 | 5.00 | 0.00 | 1.00 | 0.00 | La | 0.70 | 0.30 | 1.00 | 0.00 | 5.00 |
| *Sample No. 26 | 5.50 | 0.00 | 1.00 | 0.00 | La | 0.70 | 0.30 | 1.00 | 0.00 | 5.00 |
| Sample No. 27 | 2.00 | 0.00 | 1.00 | 0.00 | Y | 0.70 | 0.30 | 1.00 | 0.00 | 5.00 |
| Sample No. 28 | 2.00 | 0.00 | 1.00 | 0.00 | Pr | 0.70 | 0.30 | 1.00 | 0.00 | 5.00 |
| Sample No. 29 | 2.00 | 0.00 | 1.00 | 0.00 | Nd | 0.70 | 0.30 | 1.00 | 0.00 | 5.00 |
| Sample No. 30 | 2.00 | 0.00 | 1.00 | 0.00 | Sm | 0.70 | 0.30 | 1.00 | 0.00 | 15.00 |
| Sample No. 31 | 2.00 | 0.00 | 1.00 | 0.00 | Eu | 0.70 | 0.30 | 1.00 | 0.00 | 5.00 |
| Sample No. 32 | 2.00 | 0.00 | 1.00 | 0.00 | Gd | 0.70 | 0.30 | 1.00 | 0.00 | 5.00 |
| Sample No. 33 | 2.00 | 0.00 | 1.00 | 0.00 | Tb | 0.70 | 0.30 | 1.00 | 0.00 | 5.00 |
| Sample No. 34 | 2.00 | 0.00 | 1.00 | 0.00 | Dy | 0.70 | 0.30 | 1.00 | 0.00 | 5.00 |
| Sample No. 35 | 2.00 | 0.00 | 1.00 | 0.00 | Ho | 0.70 | 0.30 | 1.00 | 0.00 | 5.00 |
| Sample No. 36 | 2.00 | 0.00 | 1.00 | 0.00 | Er | 0.70 | 0.30 | 1.00 | 0.00 | 5.00 |
| Sample No. 37 | 2.00 | 0.00 | 1.00 | 0.00 | Tm | 0.70 | 0.30 | 1.00 | 0.00 | 5.00 |
| Sample No. 38 | 2.00 | 0.00 | 1.00 | 0.00 | Yb | 0.70 | 0.30 | 1.00 | 0.00 | 20.00 |
| Sample No. 39 | 2.00 | 0.00 | 1.00 | 0.00 | Lu | 0.70 | 0.30 | 1.00 | 0.00 | 5.00 |
| Sample No. 40 | 2.00 | 0.00 | 1.00 | 0.00 | La, Sm | 0.70 | 0.30 | 1.00 | 0.00 | 5.00 |
| Sample No. 41 | 2.00 | 0.00 | 1.00 | 0.00 | La | 1.00 | 0.00 | 1.00 | 0.00 | 5.00 |
| Sample No. 42 | 2.00 | 0.00 | 1.00 | 0.00 | La | 0.90 | 0.10 | 1.00 | 0.00 | 5.00 |
| Sample No. 43 | 2.00 | 0.00 | 1.00 | 0.00 | La | 0.80 | 0.20 | 1.00 | 0.00 | 5.00 |
| Sample No. 44 | 2.00 | 0.00 | 1.00 | 0.00 | La | 0.50 | 0.50 | 1.00 | 0.00 | 10.00 |
| Sample No. 45 | 2.00 | 0.00 | 1.00 | 0.00 | La | 0.20 | 0.80 | 1.00 | 0.00 | 5.00 |
| Sample No. 46 | 2.00 | 0.00 | 1.00 | 0.00 | La | 0.00 | 1.00 | 1.00 | 0.00 | 5.00 |
| Sample No. 47 | 2.00 | 0.00 | 1.00 | 0.00 | La | 0.70 | 0.30 | 0.95 | 0.05 | 12.50 |
| Sample No. 48 | 2.00 | 0.00 | 1.00 | 0.00 | La | 0.70 | 0.30 | 0.90 | 0.10 | 5.00 |
| Sample No. 49 | 2.00 | 0.00 | 1.00 | 0.00 | La | 0.70 | 0.30 | 0.50 | 0.50 | 5.00 |
| Sample No. 50 | 2.00 | 0.00 | 1.00 | 0.00 | La | 0.70 | 0.30 | 0.00 | 1.00 | 5.00 |
| Sample No. 51 | 2.00 | 0.00 | 1.00 | 0.00 | La | 0.70 | 0.30 | 1.00 | 0.00 | 5.00 |
| Sample No. 52 | 2.00 | 0.00 | 1.00 | 0.00 | La | 0.70 | 0.30 | 1.00 | 0.00 | 5.00 |
| Sample No. 53 | 2.00 | 0.00 | 1.00 | 0.00 | La | 0.70 | 0.30 | 1.00 | 0.00 | 10.00 |
| Sample No. 54 | 2.00 | 0.00 | 1.00 | 0.00 | La | 0.70 | 0.30 | 1.00 | 0.00 | 5.00 |
| Sample No. 55 | 2.00 | 0.00 | 1.00 | 0.00 | La | 0.70 | 0.30 | 1.00 | 0.00 | 5.00 |
| Sample No. 56 | 2.00 | 0.00 | 1.00 | 0.00 | La | 0.70 | 0.30 | 1.00 | 0.00 | 5.00 |
| Sample No. 57 | 2.00 | 0.00 | 1.00 | 0.00 | La | 0.70 | 0.30 | 1.00 | 0.00 | 15.00 |
| Sample No. 58 | 2.00 | 0.00 | 1.00 | 0.00 | La | 0.70 | 0.30 | 1.00 | 0.00 | 5.00 |
| Sample No. 59 | 2.00 | 0.00 | 1.00 | 0.00 | La | 0.70 | 0.30 | 1.00 | 0.00 | 5.00 |
| Sample No. 60 | 2.00 | 0.00 | 1.00 | 0.00 | La | 0.70 | 0.30 | 1.00 | 0.00 | 5.00 |
| Sample No. 61 | 2.00 | 0.00 | 1.00 | 0.00 | La | 0.70 | 0.30 | 1.00 | 0.00 | 5.00 |
| Sample No. 62 | 2.00 | 0.00 | 1.00 | 0.00 | La | 0.70 | 0.30 | 1.00 | 0.00 | 5.00 |
| Sample No. 63 | 2.00 | 0.00 | 1.00 | 0.00 | La | 0.70 | 0.30 | 1.00 | 0.00 | 5.00 |
| Sample No. 64 | 2.00 | 0.00 | 1.00 | 0.00 | La | 0.70 | 0.30 | 1.00 | 0.00 | 17.50 |
| Sample No. 65 | 2.00 | 0.00 | 1.00 | 0.00 | La | 0.70 | 0.30 | 1.00 | 0.00 | 5.00 |
| Sample No. 66 | 2.00 | 0.00 | 1.00 | 0.00 | La | 0.70 | 0.30 | 1.00 | 0.00 | 5.00 |
| Sample No. 67 | 2.00 | 0.00 | 1.00 | 0.00 | La | 1.00 | 0.00 | 0.00 | 1.00 | 5.00 |
| Sample No. 68 | 2.00 | 0.00 | 1.00 | 0.00 | Pr | 0.20 | 0.80 | 1.00 | 0.00 | 5.00 |
| Sample No. 69 | 2.00 | 0.00 | 1.00 | 0.00 | Nd | 0.00 | 1.00 | 0.00 | 1.00 | 5.00 |
| Sample No. 70 | 1.55 | 0.20 | 0.50 | 0.30 | Y | 0.80 | 0.20 | 1.00 | 0.00 | 5.00 |
| Sample No. 71 | 1.55 | 0.20 | 0.50 | 0.30 | Y | 0.80 | 0.20 | 0.90 | 0.10 | 5.00 |
| Sample No. 72 | 1.55 | 0.20 | 0.50 | 0.30 | Y | 0.80 | 0.20 | 1.00 | 0.00 | 5.00 |
| Sample No. 73 | 2.00 | 0.00 | 1.00 | 0.00 | La | 0.70 | 0.30 | 1.00 | 0.00 | 15.00 |
| Sample No. 74 | 1.55 | 0.20 | 0.50 | 0.30 | Y | 0.80 | 0.20 | 1.00 | 0.00 | 5.00 |
| Sample No. 75 | 1.55 | 0.20 | 0.50 | 0.30 | Y | 0.80 | 0.20 | 0.90 | 0.10 | 5.00 |

| | Second sub component [mol %] (with respect to 100 mol of main component) | | | | | | | | |
|---|---|---|---|---|---|---|---|---|---|
| | Mn | Mg | V | W | Mo | Si | Li | B | Al | Total |
| Sample No. 1 | — | — | — | — | — | — | — | — | — | 0.00 |
| Sample No. 2 | — | — | — | — | — | — | — | — | — | 0.00 |

TABLE 1-continued

| | | | | | | | | | | Total |
|---|---|---|---|---|---|---|---|---|---|---|
| *Sample No. 3 | — | — | — | — | — | — | — | — | — | 0.00 |
| *Sample No. 4 | — | — | — | — | — | — | — | — | — | 0.00 |
| Sample No. 5 | — | — | — | — | — | — | — | — | — | 0.00 |
| Sample No. 6 | — | — | — | — | — | — | — | — | — | 0.00 |
| Sample No. 7 | — | — | — | — | — | — | — | — | — | 0.00 |
| Sample No. 8 | — | — | — | — | — | — | — | — | — | 0.00 |
| Sample No. 9 | — | — | — | — | — | — | — | — | — | 0.00 |
| Sample No. 10 | — | — | — | — | — | — | — | — | — | 0.00 |
| *Sample No. 11 | — | — | — | — | — | — | — | — | — | 0.00 |
| Sample No. 12 | — | — | — | — | — | — | — | — | — | 0.00 |
| Sample No. 13 | — | — | — | — | — | — | — | — | — | 0.00 |
| Sample No. 14 | — | — | — | — | — | — | — | — | — | 0.00 |
| Sample No. 15 | — | — | — | — | — | — | — | — | — | 0.00 |
| Sample No. 16 | — | — | — | — | — | — | — | — | — | 0.00 |
| Sample No. 17 | — | — | — | — | — | — | — | — | — | 0.00 |
| Sample No. 18 | — | — | — | — | — | — | — | — | — | 0.00 |
| Sample No. 19 | — | — | — | — | — | — | — | — | — | 0.00 |
| Sample No. 20 | — | — | — | — | — | — | — | — | — | 0.00 |
| Sample No. 21 | — | — | — | — | — | — | — | — | — | 0.00 |
| Sample No. 22 | — | — | — | — | — | — | — | — | — | 0.00 |
| Sample No. 23 | — | — | — | — | — | — | — | — | — | 0.00 |
| Sample No. 24 | — | — | — | — | — | — | — | — | — | 0.00 |
| Sample No. 25 | — | — | — | — | — | — | — | — | — | 0.00 |
| *Sample No. 26 | — | — | — | — | — | — | — | — | — | 0.00 |
| Sample No. 27 | — | — | — | — | — | — | — | — | — | 0.00 |
| Sample No. 28 | — | — | — | — | — | — | — | — | — | 0.00 |
| Sample No. 29 | — | — | — | — | — | — | — | — | — | 0.00 |
| Sample No. 30 | — | — | — | — | — | — | — | — | — | 0.00 |
| Sample No. 31 | — | — | — | — | — | — | — | — | — | 0.00 |
| Sample No. 32 | — | — | — | — | — | — | — | — | — | 0.00 |
| Sample No. 33 | — | — | — | — | — | — | — | — | — | 0.00 |
| Sample No. 34 | — | — | — | — | — | — | — | — | — | 0.00 |
| Sample No. 35 | — | — | — | — | — | — | — | — | — | 0.00 |
| Sample No. 36 | — | — | — | — | — | — | — | — | — | 0.00 |
| Sample No. 37 | — | — | — | — | — | — | — | — | — | 0.00 |
| Sample No. 38 | — | — | — | — | — | — | — | — | — | 0.00 |
| Sample No. 39 | — | — | — | — | — | — | — | — | — | 0.00 |
| Sample No. 40 | — | — | — | — | — | — | — | — | — | 0.00 |
| Sample No. 41 | — | — | — | — | — | — | — | — | — | 0.00 |
| Sample No. 42 | — | — | — | — | — | — | — | — | — | 0.00 |
| Sample No. 43 | — | — | — | — | — | — | — | — | — | 0.00 |
| Sample No. 44 | — | — | — | — | — | — | — | — | — | 0.00 |
| Sample No. 45 | — | — | — | — | — | — | — | — | — | 0.00 |
| Sample No. 46 | — | — | — | — | — | — | — | — | — | 0.00 |
| Sample No. 47 | — | — | — | — | — | — | — | — | — | 0.00 |
| Sample No. 48 | — | — | — | — | — | — | — | — | — | 0.00 |
| Sample No. 49 | — | — | — | — | — | — | — | — | — | 0.00 |
| Sample No. 50 | — | — | — | — | — | — | — | — | — | 0.00 |
| Sample No. 51 | 0.05 | — | — | — | — | — | — | — | — | 0.05 |
| Sample No. 52 | 0.10 | — | — | — | — | — | — | — | — | 0.10 |
| Sample No. 53 | 1.00 | — | — | — | — | — | — | — | — | 1.00 |
| Sample No. 54 | 10.00 | — | — | — | — | — | — | — | — | 10.00 |
| Sample No. 55 | 20.00 | — | — | — | — | — | — | — | — | 20.00 |
| Sample No. 56 | 30.00 | — | — | — | — | — | — | — | — | 30.00 |
| Sample No. 57 | — | 1.00 | — | — | — | — | — | — | — | 1.00 |
| Sample No. 58 | — | — | 1.00 | — | — | — | — | — | — | 1.00 |
| Sample No. 59 | — | — | — | 1.00 | — | — | — | — | — | 1.00 |
| Sample No. 60 | — | — | — | — | 1.00 | — | — | — | — | 1.00 |
| Sample No. 61 | — | — | — | — | — | 1.00 | — | — | — | 1.00 |
| Sample No. 62 | — | — | — | — | — | — | 1.00 | — | — | 1.00 |
| Sample No. 63 | — | — | — | — | — | — | — | 1.00 | — | 1.00 |
| Sample No. 64 | — | — | — | — | — | — | — | — | 1.00 | 1.00 |
| Sample No. 65 | — | — | — | 3.00 | — | 3.00 | — | — | — | 6.00 |
| Sample No. 66 | 5.00 | — | 1.00 | 1.00 | — | 0.05 | — | — | 10.00 | 17.05 |
| Sample No. 67 | 10.00 | — | — | — | — | — | — | — | — | 10.00 |
| Sample No. 68 | 5.00 | — | — | — | — | — | — | — | — | 5.00 |
| Sample No. 69 | — | — | — | — | — | — | — | — | 5.00 | 5.00 |
| Sample No. 70 | — | — | — | — | — | — | — | — | — | 0.00 |
| Sample No. 71 | — | — | — | — | — | — | — | — | — | 0.00 |
| Sample No. 72 | — | — | — | — | 1.00 | — | — | — | — | 1.00 |
| Sample No. 73 | — | — | — | — | — | — | — | — | — | 0.00 |
| Sample No. 74 | — | — | — | — | — | — | — | — | — | 0.00 |
| Sample No. 75 | — | — | — | — | — | — | — | — | — | 0.00 |

"—" indicates that this component is not included

The calcination powder of the main component and the calcination powder of the sub component obtained above were mixed and ground, thereby the material of the dielectric composition was obtained. To 1000 g of this material of the dielectric composition, 700 g of the solvent mixed with toluene+ethanol solution, a plasticizer, and a dispersant in a ratio of 90:6:4 were introduced, and then the dispersion was carried out for 2 hours using a basket mill which is a widely known dispersing method. Thereby, the dielectric layer paste was produced. Note that, the viscosities of these pastes were regulated to about 200 cps.

As the material of the internal electrode layer, Ni having the average particle size of 0.2 μm, Al having the average particle size of 0.1 μm or less, and the oxide of Si having the average particle size of 0.1 μm or less were prepared, then the content of Al and the content of Si (the content of oxide of Si in terms of Si) were weighed so that the total content thereof satisfies 5 mass % of Ni. Then, the heat treatment was carried out in the mixed wet gas of $N_2$ and $H_2$ at 1200° C. or higher and grinding was carried out using a ball mill, thereby the several material powders having the average particles size of 0.20 μm or more were prepared.

100 parts by mass of the material powder, 30 parts by mass of organic vehicle (8 parts by mass of ethyl cellulose resin dissolved in 92 parts by mass of butyl carbitol), and 8 parts by mass of butyl carbitol were kneaded by a triple roll to form a paste, thereby the internal electrode layer paste was obtained.

Then, by using the above obtained dielectric layer paste, a green sheet was formed on a PET film so that the thickness after drying was 12 μm. Next, by using the internal electrode layer paste, an internal electrode layer was printed in a predetermined pattern thereon, followed by removing the sheet from the PET film, thereby the green sheet with the electrode layer was obtained. A plurality of green sheets with the internal electrode layer were stacked and adhered by pressure to obtain a green multilayer body. The green multilayer body was cut into a predetermined size to obtain a green chip.

Then, the obtained green chip was subjected to the binder removal treatment, the sintering and the annealing in the following conditions to obtain a multilayer ceramic sintered body. Also, the wetter was used in order to wet the atmosphere gas.

(Binder Removal Treatment)
Temperature increasing rate: 100° C./hour
Holding temperature: 400° C.
Temperature holding time: 8.0 hours
Atmosphere gas: Mixed gas of wet $N_2$ and $H_2$
(Sintering)
Temperature increasing rate: 500° C./hour
Holding temperature: 1200° C. to 1350° C.
Temperature holding time: 2.0 hours
Temperature decreasing rate: 100° C./hour
Atmosphere gas: Mixed gas of wet $N_2$ and $H_2$
Oxygen partial pressure: $10^{-5}$ to $10^{-9}$ Pa
(Annealing Treatment)
Holding temperature: 800° C. to 1000° C.
Temperature holding time: 2.0 hours
Temperature increasing and decreasing rate: 200° C./hour
Atmosphere gas: Mixed gas of wet $N_2$ and $H_2$ The obtained dielectric layer (the dielectric composition) of each multilayer ceramic sintered body was subjected to the compositional analysis for each sample using ICP emission spectrometric analysis. The result confirmed that the values were about the same as the composition of the material of the dielectric composition shown in Table 1.

Also, the obtained dielectric layer (the dielectric composition) of each multilayer ceramic sintered body was verified whether it had the tungsten-bronze type crystal structure by X-ray diffraction pattern. In case the tungsten-bronze type crystal structure was confirmed, it was evaluated "o", and in case the tungsten-bronze type crystal structure was not confirmed, then it was evaluated as "x". The results are shown in Table 2. Note that, in Table 2, the tungsten-bronze type is referred as "TB type".

After polishing end faces of the obtained multilayer ceramic sintered body with sandblast, In—Ga eutectic alloy was coated as an external electrode to obtain a sample of the multilayer ceramic capacitor of the sample No. 1 to the sample No. 75 having the same shape as the multilayer ceramic capacitor shown in the FIGURE. The size of the obtained multilayer capacitor sample was 3.2 mm×1.6 mm×1.2 mm, the thickness of the dielectric layer was 10 μm, the thickness of the internal electrode layer was 2 μm, and the number of the dielectric layers in between the internal electrode layers was 50.

For the multilayer ceramic capacitor samples of the sample No. 1 to sample No. 75, the specific permittivity (εs), the specific resistivity, the high temperature accelerated lifetime, and the voltage resistance were measured by the method described below. The results are shown in Table 2.

[Specific Permittivity (εs)]

For the multilayer ceramic capacitor samples, the capacitance C was measured at 25° C. by digital LCR meter (4284A made by YHP), at a frequency of 1 kHz, and input signal level (measured voltage) of 1 Vrms. Then, the specific permittivity εs (no unit) was calculated from the thickness of the dielectric layer, the effective electrode area, and the measured capacitance C. The higher the specific permittivity is, the more preferable it is; and 250 or more was considered good.

[Specific Resistivity]

For the multilayer ceramic capacitor sample, the insulation resistance was measured using the digital resistance meter (R8340 made by Advantest) under the condition of 225° C., the measuring voltage of 30V, and the measurement time of 60 seconds. The specific resistivity was calculated from the electrode area and the thickness of the dielectric layer of the capacitor sample. The higher the resistivity is, the more preferable it is, and $1.00 \times 10^{12}$ Ωcm or more, and more preferably $6.00 \times 10^{12}$ Ωcm or more was considered good. If the specific resistivity is low, the leakage current of the capacitor increases, and malfunction may occur in the electric circuit.

[High Temperature Accelerated Lifetime]

For the high temperature accelerated lifetime test, DC voltage was applied to each of 200 capacitor samples under the electric field of 40 V/μm at 250° C., and then the insulation resistance change with time was measured. The time which took for the insulation resistance to drop by one digit was defined as the failure time, and then the mean time to failure (MTTF) of 50% was obtained from Weibull analysis. In the present invention, the mean time to failure (MTTF) was defined as the high temperature accelerated lifetime. The longer the high accelerated lifetime is, the more preferable it is, and 500 hours or more, more preferably 550 hours or more, and even more preferably 1200 hours or more was considered good.

[Voltage Resistance]

The AC voltage was applied to the multilayer ceramic capacitor sample, under the condition of 250° C. at the voltage increasing rate of 100 V/sec, and when the leakage current exceeded the AC voltage, this was defined as the AC voltage resistance. The AC voltage resistance is preferably high and 75.0 V/μm or more was considered good. Further, 100.0 V/μm or more was more preferable.

[Table 2]

TABLE 2

| | TB type | 25° C. Specific permittivity [—] | 225° C. Specific resistivity [Ω cm] | 250° C. High temperature accelerated lifetime [h] | 250° C. AC voltage resistance [V/μm] |
|---|---|---|---|---|---|
| Sample 1 | o | 268 | 1.25E+12 | 586 | 77 |
| Sample 2 | o | 263 | 1.05E+12 | 561 | 84 |
| *Sample 3 | o | 266 | 1.07E+12 | 27 | 48 |
| *Sample 4 | o | 262 | 1.08E+12 | 120 | 42 |
| Sample 5 | o | 266 | 1.13E+12 | 566 | 81 |
| Sample 6 | o | 271 | 1.28E+12 | 596 | 77 |
| Sample 7 | o | 263 | 1.07E+12 | 1326 | 79 |
| Sample 8 | o | 266 | 1.01E+12 | 1348 | 88 |
| Sample 9 | o | 268 | 1.28E+12 | 1355 | 85 |
| Sample 10 | o | 261 | 1.32E+12 | 669 | 77 |
| *Sample 11 | o | 275 | 1.25E+12 | 220 | 38 |
| Sample 12 | o | 277 | 1.40E+12 | 598 | 75 |
| Sample 13 | o | 270 | 1.24E+12 | 591 | 88 |
| Sample 14 | o | 279 | 1.31E+12 | 1275 | 76 |
| Sample 15 | o | 258 | 1.15E+12 | 582 | 80 |
| Sample 16 | o | 264 | 1.04E+12 | 604 | 80 |
| Sample 17 | o | 275 | 1.19E+12 | 555 | 75 |
| Sample 18 | o | 256 | 1.35E+12 | 579 | 90 |
| Sample 19 | o | 262 | 1.25E+12 | 558 | 82 |
| Sample 20 | o | 279 | 1.02E+12 | 1288 | 79 |
| Sample 21 | o | 266 | 1.33E+12 | 589 | 86 |
| Sample 22 | o | 275 | 1.19E+12 | 580 | 80 |
| Sample 23 | o | 276 | 1.39E+12 | 604 | 79 |
| Sample 24 | x | 302 | 1.35E+12 | 235 | 42 |
| Sample 25 | x | 321 | 1.15E+12 | 195 | 48 |
| *Sample 26 | x | 223 | 9.62E+10 | 72 | 29 |
| Sample 27 | o | 278 | 1.27E+12 | 612 | 76 |
| Sample 28 | o | 280 | 1.07E+12 | 579 | 76 |
| Sample 29 | o | 270 | 1.21E+12 | 569 | 79 |
| Sample 30 | o | 264 | 1.10E+12 | 1388 | 82 |
| Sample 31 | o | 272 | 1.25E+12 | 595 | 75 |
| Sample 32 | o | 272 | 1.06E+12 | 585 | 78 |
| Sample 33 | o | 262 | 1.03E+12 | 583 | 75 |
| Sample 34 | o | 260 | 1.22E+12 | 592 | 78 |
| Sample 35 | o | 263 | 1.18E+12 | 608 | 79 |
| Sample 36 | o | 284 | 1.12E+12 | 579 | 84 |
| Sample 37 | o | 271 | 1.29E+12 | 567 | 78 |
| Sample 38 | o | 260 | 1.04E+12 | 654 | 80 |
| Sample 39 | o | 262 | 1.17E+12 | 563 | 75 |
| Sample 40 | o | 264 | 1.34E+12 | 610 | 77 |
| Sample 41 | o | 256 | 1.25E+12 | 571 | 78 |
| Sample 42 | o | 260 | 1.01E+12 | 562 | 82 |
| Sample 43 | o | 283 | 1.10E+12 | 601 | 76 |
| Sample 44 | o | 266 | 1.22E+12 | 1210 | 85 |
| Sample 45 | o | 272 | 1.46E+12 | 557 | 80 |
| Sample 46 | o | 267 | 1.11E+12 | 571 | 76 |
| Sample 47 | o | 266 | 1.34E+12 | 1257 | 78 |
| Sample 48 | o | 272 | 1.16E+12 | 585 | 80 |
| Sample 49 | o | 261 | 1.37E+12 | 559 | 82 |
| Sample 50 | o | 273 | 1.08E+12 | 573 | 79 |
| Sample 51 | o | 262 | 4.95E+12 | 560 | 90 |
| Sample 52 | o | 274 | 6.69E+12 | 599 | 106 |
| Sample 53 | o | 263 | 6.06E+12 | 1289 | 101 |
| Sample 54 | o | 269 | 6.36E+12 | 603 | 103 |
| Sample 55 | o | 265 | 6.51E+12 | 567 | 120 |
| Sample 56 | o | 262 | 5.82E+12 | 561 | 91 |
| Sample 57 | o | 276 | 6.41E+12 | 1391 | 112 |
| Sample 58 | o | 258 | 6.49E+12 | 564 | 105 |
| Sample 59 | o | 281 | 6.47E+12 | 614 | 124 |
| Sample 60 | o | 267 | 6.45E+12 | 575 | 108 |
| Sample 61 | o | 261 | 6.78E+12 | 605 | 117 |
| Sample 62 | o | 268 | 6.37E+12 | 568 | 111 |
| Sample 63 | o | 285 | 6.24E+12 | 595 | 115 |
| Sample 64 | o | 269 | 6.25E+12 | 1307 | 109 |
| Sample 65 | o | 264 | 6.15E+12 | 600 | 118 |
| Sample 66 | o | 274 | 6.60E+12 | 560 | 108 |
| Sample 67 | o | 270 | 6.52E+12 | 581 | 112 |
| Sample 68 | o | 267 | 6.33E+12 | 570 | 110 |
| Sample 69 | o | 261 | 6.43E+12 | 583 | 107 |
| Sample 70 | o | 273 | 1.31E+12 | 583 | 77 |
| Sample 71 | o | 282 | 1.26E+12 | 560 | 82 |
| Sample 72 | o | 270 | 6.47E+12 | 599 | 108 |
| Sample 73 | o | 263 | 1.33E+12 | 1328 | 81 |
| Sample 74 | o | 261 | 1.22E+12 | 565 | 85 |
| Sample 75 | o | 276 | 1.15E+12 | 608 | 86 |

According to Table 2, in regards with the sample No. 1, 2, 5 to 10, 12 to 25, and 27 to 75 wherein the main component was expressed by the chemical formula of $A_{6-x}B_xC_{x+2}D_{8-x}O_{30}$, "x" satisfied $0 \leq x \leq 5$, and included 2.50 mol or more and 20.00 mol or less of the oxide of Ge as the first sub component with respect to the main component, the specific permittivity at 25° C., the specific resistivity at 225° C., the high temperature accelerated lifetime at 250° C., and the AC voltage resistance at 250° C. were excellent.

Among these, in regards with the sample No. 1, 2, 5 to 10, 12 to 23, and 27 to 75 wherein the main component had the tungsten-bronze type crystal structure, the high temperature accelerated lifetime at 250° C. and the AC voltage at 250° C. were particularly excellent.

Also, for the sample No. 51 to 69, and 72, which included 0.10 mol or more and 20.00 mol or less of oxides of at least one element selected from the group consisting of Mn, Mg, V, W, Mo, Si, Li, B, and Al had particularly excellent AC voltage resistance at 250° C.

Example 2

For the example 2, the multilayer ceramic capacitors of sample No. 101 to 175 were obtained as same as the example 1 except for weighing the starting material to satisfy the blending ratio shown in Table 3.

For the obtained multilayer ceramic capacitors of sample No. 101 to 175, the presence of the tungsten-bronze type crystal structure was verified by the same method as the example 1, and the specific permittivity, the specific resistance, the high temperature accelerated lifetime, and the voltage resistance were measured.

Further, the multilayer ceramic capacitor sample was cut, and the cross section of the dielectric composition was observed. Specifically, with respect to the field of vision which contains at least 100 or more of crystal grains, each crystal grain was verified whether Ge was substantially included, and the ratio of the crystal grain which substantially does not include Ge was also verified by using FE-TEM-EDX. That is, the ratio of the crystal grain with less than 10% of the area ratio having Ge was specified. Specifically, using FE-TEM-EDX, for each crystal grain, the area having Ge was identified, and then the ratio of the crystal grain having less than 10% of said area with respect to the entire crystal grain was identified. The condition of EDX was a probe diameter of 1 nm, and an accelerating voltage of 200 kV. Further, the average concentration of Ge at the grain boundary in said field of vision was measured. Specifically, 20 measurement points were selected arbitrarily from the grain boundary in said field of vision to measure the concentration of Ge, then the average concentration $C_1$ was obtained. Also, the concentration of Ge of each crystal grain substantially including Ge was measured, and then the average concentration $C_2$ was obtained. Then, $C_1/C_2$ of each sample was calculated. The results are shown in Table 4. Note that, the in Table 4, the tungsten-bronze type is referred as TB type.

TABLE 3

| Sample No. (*indicates comparative example) | Main component [mol %] | | | | | | | | First sub component [mol %] |
|---|---|---|---|---|---|---|---|---|---|
| | x | A | | | B | C | | D | | Ge |
| | | Sr | Ba | Ca | | Ti | Zr | Nb | Ta | |
| 101 | 2.00 | 0.00 | 1.00 | 0.00 | La | 0.70 | 0.30 | 1.00 | 0.00 | 5.00 |
| 102 | 2.00 | 0.30 | 0.70 | 0.00 | La | 0.70 | 0.30 | 1.00 | 0.00 | 5.00 |
| 103* | 2.00 | 0.50 | 0.50 | 0.00 | La | 0.70 | 0.30 | 1.00 | 0.00 | 0.00 |
| 104* | 2.00 | 0.50 | 0.50 | 0.00 | La | 0.70 | 0.30 | 1.00 | 0.00 | 2.00 |
| 105 | 2.00 | 0.50 | 0.50 | 0.00 | La | 0.70 | 0.30 | 1.00 | 0.00 | 2.50 |
| 106 | 2.00 | 0.50 | 0.50 | 0.00 | La | 0.70 | 0.30 | 1.00 | 0.00 | 5.00 |
| 107 | 2.00 | 0.50 | 0.50 | 0.00 | La | 0.70 | 0.30 | 1.00 | 0.00 | 10.00 |
| 108 | 2.00 | 0.50 | 0.50 | 0.00 | La | 0.70 | 0.30 | 1.00 | 0.00 | 15.00 |
| 109 | 2.00 | 0.50 | 0.50 | 0.00 | La | 0.70 | 0.30 | 1.00 | 0.00 | 17.50 |
| 110 | 2.00 | 0.50 | 0.50 | 0.00 | La | 0.70 | 0.30 | 1.00 | 0.00 | 20.00 |
| 111 | 2.00 | 0.50 | 0.50 | 0.00 | La | 0.70 | 0.30 | 1.00 | 0.00 | 17.00 |
| 112 | 2.00 | 0.00 | 0.70 | 0.30 | La | 0.70 | 0.30 | 1.00 | 0.00 | 5.00 |
| 113 | 2.00 | 0.20 | 0.50 | 0.30 | La | 0.70 | 0.30 | 1.00 | 0.00 | 5.00 |
| 114 | 2.00 | 0.30 | 0.40 | 0.30 | La | 0.70 | 0.30 | 1.00 | 0.00 | 12.50 |
| 115 | 2.00 | 0.60 | 0.40 | 0.00 | La | 0.70 | 0.30 | 1.00 | 0.00 | 5.00 |
| 116 | 2.00 | 0.10 | 0.50 | 0.40 | La | 0.70 | 0.30 | 1.00 | 0.00 | 5.00 |
| 117 | 2.00 | 0.00 | 0.50 | 0.50 | La | 0.70 | 0.30 | 1.00 | 0.00 | 5.00 |
| 118 | 2.00 | 0.00 | 0.40 | 0.60 | La | 0.70 | 0.30 | 1.00 | 0.00 | 5.00 |
| 119 | 0.00 | 0.00 | 1.00 | 0.00 | La | 0.70 | 0.30 | 1.00 | 0.00 | 5.00 |
| 120 | 0.10 | 0.00 | 1.00 | 0.00 | La | 0.70 | 0.30 | 1.00 | 0.00 | 10.00 |
| 121 | 0.50 | 0.00 | 1.00 | 0.00 | La | 0.70 | 0.30 | 1.00 | 0.00 | 5.00 |
| 122 | 1.00 | 0.00 | 1.00 | 0.00 | La | 0.70 | 0.30 | 1.00 | 0.00 | 5.00 |
| 123 | 3.00 | 0.00 | 1.00 | 0.00 | La | 0.70 | 0.30 | 1.00 | 0.00 | 5.00 |
| 124 | 4.00 | 0.00 | 1.00 | 0.00 | La | 0.70 | 0.30 | 1.00 | 0.00 | 7.50 |
| 125 | 5.00 | 0.00 | 1.00 | 0.00 | La | 0.70 | 0.30 | 1.00 | 0.00 | 5.00 |
| 126* | 5.50 | 0.00 | 1.00 | 0.00 | La | 0.70 | 0.30 | 1.00 | 0.00 | 5.00 |
| 127 | 2.00 | 0.00 | 1.00 | 0.00 | Y | 0.70 | 0.30 | 1.00 | 0.00 | 5.00 |
| 128 | 2.00 | 0.00 | 1.00 | 0.00 | Pr | 0.70 | 0.30 | 1.00 | 0.00 | 5.00 |
| 129 | 2.00 | 0.00 | 1.00 | 0.00 | Nd | 0.70 | 0.30 | 1.00 | 0.00 | 5.00 |
| 130 | 2.00 | 0.00 | 1.00 | 0.00 | Sm | 0.70 | 0.30 | 1.00 | 0.00 | 15.00 |
| 131 | 2.00 | 0.00 | 1.00 | 0.00 | Eu | 0.70 | 0.30 | 1.00 | 0.00 | 5.00 |
| 132 | 2.00 | 0.00 | 1.00 | 0.00 | Gd | 0.70 | 0.30 | 1.00 | 0.00 | 5.00 |
| 133 | 2.00 | 0.00 | 1.00 | 0.00 | Tb | 0.70 | 0.30 | 1.00 | 0.00 | 5.00 |
| 134 | 2.00 | 0.00 | 1.00 | 0.00 | Dy | 0.70 | 0.30 | 1.00 | 0.00 | 5.00 |
| 135 | 2.00 | 0.00 | 1.00 | 0.00 | Ho | 0.70 | 0.30 | 1.00 | 0.00 | 5.00 |
| 136 | 2.00 | 0.00 | 1.00 | 0.00 | Er | 0.70 | 0.30 | 1.00 | 0.00 | 5.00 |
| 137 | 2.00 | 0.00 | 1.00 | 0.00 | Tm | 0.70 | 0.30 | 1.00 | 0.00 | 5.00 |
| 138 | 2.00 | 0.00 | 1.00 | 0.00 | Yb | 0.70 | 0.30 | 1.00 | 0.00 | 20.00 |
| 139 | 2.00 | 0.00 | 1.00 | 0.00 | Lu | 0.70 | 0.30 | 1.00 | 0.00 | 5.00 |
| 140 | 2.00 | 0.00 | 1.00 | 0.00 | La, Sm | 0.70 | 0.30 | 1.00 | 0.00 | 5.00 |
| 141 | 2.00 | 0.00 | 1.00 | 0.00 | La | 1.00 | 0.00 | 1.00 | 0.00 | 5.00 |
| 142 | 2.00 | 0.00 | 1.00 | 0.00 | La | 0.90 | 0.10 | 1.00 | 0.00 | 5.00 |
| 143 | 2.00 | 0.00 | 1.00 | 0.00 | La | 0.80 | 0.20 | 1.00 | 0.00 | 5.00 |
| 144 | 2.00 | 0.00 | 1.00 | 0.00 | La | 0.50 | 0.50 | 1.00 | 0.00 | 10.00 |
| 145 | 2.00 | 0.00 | 1.00 | 0.00 | La | 0.20 | 0.80 | 1.00 | 0.00 | 5.00 |
| 146 | 2.00 | 0.00 | 1.00 | 0.00 | La | 0.00 | 1.00 | 1.00 | 0.00 | 5.00 |
| 147 | 2.00 | 0.00 | 1.00 | 0.00 | La | 0.70 | 0.30 | 0.95 | 0.05 | 12.50 |
| 148 | 2.00 | 0.00 | 1.00 | 0.00 | La | 0.70 | 0.30 | 0.90 | 0.10 | 5.00 |
| 149 | 2.00 | 0.00 | 1.00 | 0.00 | La | 0.70 | 0.30 | 0.50 | 0.50 | 5.00 |
| 150 | 2.00 | 0.00 | 1.00 | 0.00 | La | 0.70 | 0.30 | 0.00 | 1.00 | 5.00 |
| 151 | 2.00 | 0.00 | 1.00 | 0.00 | La | 0.70 | 0.30 | 1.00 | 0.00 | 5.00 |
| 152 | 2.00 | 0.00 | 1.00 | 0.00 | La | 0.70 | 0.30 | 1.00 | 0.00 | 5.00 |
| 153 | 2.00 | 0.00 | 1.00 | 0.00 | La | 0.70 | 0.30 | 1.00 | 0.00 | 10.00 |
| 154 | 2.00 | 0.00 | 1.00 | 0.00 | La | 0.70 | 0.30 | 1.00 | 0.00 | 5.00 |
| 155 | 2.00 | 0.00 | 1.00 | 0.00 | La | 0.70 | 0.30 | 1.00 | 0.00 | 5.00 |
| 156 | 2.00 | 0.00 | 1.00 | 0.00 | La | 0.70 | 0.30 | 1.00 | 0.00 | 5.00 |
| 157 | 2.00 | 0.00 | 1.00 | 0.00 | La | 0.70 | 0.30 | 1.00 | 0.00 | 15.00 |
| 158 | 2.00 | 0.00 | 1.00 | 0.00 | La | 0.70 | 0.30 | 1.00 | 0.00 | 5.00 |
| 159 | 2.00 | 0.00 | 1.00 | 0.00 | La | 0.70 | 0.30 | 1.00 | 0.00 | 5.00 |
| 160 | 2.00 | 0.00 | 1.00 | 0.00 | La | 0.70 | 0.30 | 1.00 | 0.00 | 5.00 |
| 161 | 2.00 | 0.00 | 1.00 | 0.00 | La | 0.70 | 0.30 | 1.00 | 0.00 | 5.00 |
| 162 | 2.00 | 0.00 | 1.00 | 0.00 | La | 0.70 | 0.30 | 1.00 | 0.00 | 5.00 |
| 163 | 2.00 | 0.00 | 1.00 | 0.00 | La | 0.70 | 0.30 | 1.00 | 0.00 | 5.00 |
| 164 | 2.00 | 0.00 | 1.00 | 0.00 | La | 0.70 | 0.30 | 1.00 | 0.00 | 17.50 |
| 165 | 2.00 | 0.00 | 1.00 | 0.00 | La | 0.70 | 0.30 | 1.00 | 0.00 | 5.00 |
| 166 | 2.00 | 0.00 | 1.00 | 0.00 | La | 0.70 | 0.30 | 1.00 | 0.00 | 5.00 |
| 167 | 2.00 | 0.00 | 1.00 | 0.00 | La | 1.00 | 0.00 | 0.00 | 1.00 | 5.00 |
| 168 | 2.00 | 0.00 | 1.00 | 0.00 | Pr | 0.20 | 0.80 | 1.00 | 0.00 | 5.00 |
| 169 | 2.00 | 0.00 | 1.00 | 0.00 | Nd | 0.00 | 1.00 | 0.00 | 1.00 | 5.00 |
| 170 | 1.55 | 0.20 | 0.50 | 0.30 | Y | 0.80 | 0.20 | 1.00 | 0.00 | 5.00 |
| 171 | 1.55 | 0.20 | 0.50 | 0.30 | Y | 0.80 | 0.20 | 0.90 | 0.10 | 5.00 |
| 172 | 1.55 | 0.20 | 0.50 | 0.30 | Y | 0.80 | 0.20 | 1.00 | 0.00 | 5.00 |
| 173 | 2.00 | 0.00 | 1.00 | 0.00 | La | 0.70 | 0.30 | 1.00 | 0.00 | 15.00 |

TABLE 3-continued

| 174 | 1.55 | 0.20 | 0.50 | 0.30 | Y | 0.80 | 0.20 | 1.00 | 0.00 | 5.00 |
| 175 | 1.55 | 0.20 | 0.50 | 0.30 | Y | 0.80 | 0.20 | 0.90 | 0.10 | 5.00 |

| Sample No. (*indicates comparative example) | Second sub component [mol %] | | | | | | | | | Total (excluding V) |
|---|---|---|---|---|---|---|---|---|---|---|
| | V | Mn | Mg | W | Mo | Si | Li | B | Al | |
| 101 | 2.00 | 0.00 | 0.00 | 0.00 | 0.00 | 0.00 | 0.00 | 0.00 | 0.00 | 0.00 |
| 102 | 2.00 | 0.00 | 0.00 | 0.00 | 0.00 | 0.00 | 0.00 | 0.00 | 0.00 | 0.00 |
| 103* | 0.00 | 0.00 | 0.00 | 0.00 | 0.00 | 0.00 | 0.00 | 0.00 | 0.00 | 0.00 |
| 104* | 0.00 | 0.00 | 0.00 | 0.00 | 0.00 | 0.00 | 0.00 | 0.00 | 0.00 | 0.00 |
| 105 | 2.00 | 0.00 | 0.00 | 0.00 | 0.00 | 0.00 | 0.00 | 0.00 | 0.00 | 0.00 |
| 106 | 2.00 | 0.00 | 0.00 | 0.00 | 0.00 | 0.00 | 0.00 | 0.00 | 0.00 | 0.00 |
| 107 | 2.00 | 0.00 | 0.00 | 0.00 | 0.00 | 0.00 | 0.00 | 0.00 | 0.00 | 0.00 |
| 108 | 2.00 | 0.00 | 0.00 | 0.00 | 0.00 | 0.00 | 0.00 | 0.00 | 0.00 | 0.00 |
| 109 | 2.00 | 0.00 | 0.00 | 0.00 | 0.00 | 0.00 | 0.00 | 0.00 | 0.00 | 0.00 |
| 110 | 2.00 | 0.00 | 0.00 | 0.00 | 0.00 | 0.00 | 0.00 | 0.00 | 0.00 | 0.00 |
| 111 | 4.00 | 0.00 | 0.00 | 0.00 | 0.00 | 0.00 | 0.00 | 0.00 | 0.00 | 0.00 |
| 112 | 2.00 | 0.00 | 0.00 | 0.00 | 0.00 | 0.00 | 0.00 | 0.00 | 0.00 | 0.00 |
| 113 | 2.00 | 0.00 | 0.00 | 0.00 | 0.00 | 0.00 | 0.00 | 0.00 | 0.00 | 0.00 |
| 114 | 2.00 | 0.00 | 0.00 | 0.00 | 0.00 | 0.00 | 0.00 | 0.00 | 0.00 | 0.00 |
| 115 | 2.00 | 0.00 | 0.00 | 0.00 | 0.00 | 0.00 | 0.00 | 0.00 | 0.00 | 0.00 |
| 116 | 2.00 | 0.00 | 0.00 | 0.00 | 0.00 | 0.00 | 0.00 | 0.00 | 0.00 | 0.00 |
| 117 | 2.00 | 0.00 | 0.00 | 0.00 | 0.00 | 0.00 | 0.00 | 0.00 | 0.00 | 0.00 |
| 118 | 2.00 | 0.00 | 0.00 | 0.00 | 0.00 | 0.00 | 0.00 | 0.00 | 0.00 | 0.00 |
| 119 | 2.00 | 0.00 | 0.00 | 0.00 | 0.00 | 0.00 | 0.00 | 0.00 | 0.00 | 0.00 |
| 120 | 2.00 | 0.00 | 0.00 | 0.00 | 0.00 | 0.00 | 0.00 | 0.00 | 0.00 | 0.00 |
| 121 | 2.00 | 0.00 | 0.00 | 0.00 | 0.00 | 0.00 | 0.00 | 0.00 | 0.00 | 0.00 |
| 122 | 2.00 | 0.00 | 0.00 | 0.00 | 0.00 | 0.00 | 0.00 | 0.00 | 0.00 | 0.00 |
| 123 | 2.00 | 0.00 | 0.00 | 0.00 | 0.00 | 0.00 | 0.00 | 0.00 | 0.00 | 0.00 |
| 124 | 2.00 | 0.00 | 0.00 | 0.00 | 0.00 | 0.00 | 0.00 | 0.00 | 0.00 | 0.00 |
| 125 | 2.00 | 0.00 | 0.00 | 0.00 | 0.00 | 0.00 | 0.00 | 0.00 | 0.00 | 0.00 |
| 126* | 2.00 | 0.00 | 0.00 | 0.00 | 0.00 | 0.00 | 0.00 | 0.00 | 0.00 | 0.00 |
| 127 | 2.00 | 0.00 | 0.00 | 0.00 | 0.00 | 0.00 | 0.00 | 0.00 | 0.00 | 0.00 |
| 128 | 2.00 | 0.00 | 0.00 | 0.00 | 0.00 | 0.00 | 0.00 | 0.00 | 0.00 | 0.00 |
| 129 | 2.00 | 0.00 | 0.00 | 0.00 | 0.00 | 0.00 | 0.00 | 0.00 | 0.00 | 0.00 |
| 130 | 2.00 | 0.00 | 0.00 | 0.00 | 0.00 | 0.00 | 0.00 | 0.00 | 0.00 | 0.00 |
| 131 | 2.00 | 0.00 | 0.00 | 0.00 | 0.00 | 0.00 | 0.00 | 0.00 | 0.00 | 0.00 |
| 132 | 2.00 | 0.00 | 0.00 | 0.00 | 0.00 | 0.00 | 0.00 | 0.00 | 0.00 | 0.00 |
| 133 | 2.00 | 0.00 | 0.00 | 0.00 | 0.00 | 0.00 | 0.00 | 0.00 | 0.00 | 0.00 |
| 134 | 2.00 | 0.00 | 0.00 | 0.00 | 0.00 | 0.00 | 0.00 | 0.00 | 0.00 | 0.00 |
| 135 | 2.00 | 0.00 | 0.00 | 0.00 | 0.00 | 0.00 | 0.00 | 0.00 | 0.00 | 0.00 |
| 136 | 2.00 | 0.00 | 0.00 | 0.00 | 0.00 | 0.00 | 0.00 | 0.00 | 0.00 | 0.00 |
| 137 | 2.00 | 0.00 | 0.00 | 0.00 | 0.00 | 0.00 | 0.00 | 0.00 | 0.00 | 0.00 |
| 138 | 2.00 | 0.00 | 0.00 | 0.00 | 0.00 | 0.00 | 0.00 | 0.00 | 0.00 | 0.00 |
| 139 | 2.00 | 0.00 | 0.00 | 0.00 | 0.00 | 0.00 | 0.00 | 0.00 | 0.00 | 0.00 |
| 140 | 2.00 | 0.00 | 0.00 | 0.00 | 0.00 | 0.00 | 0.00 | 0.00 | 0.00 | 0.00 |
| 141 | 2.00 | 0.00 | 0.00 | 0.00 | 0.00 | 0.00 | 0.00 | 0.00 | 0.00 | 0.00 |
| 142 | 2.00 | 0.00 | 0.00 | 0.00 | 0.00 | 0.00 | 0.00 | 0.00 | 0.00 | 0.00 |
| 143 | 2.00 | 0.00 | 0.00 | 0.00 | 0.00 | 0.00 | 0.00 | 0.00 | 0.00 | 0.00 |
| 144 | 1.50 | 0.00 | 0.00 | 0.00 | 0.00 | 0.00 | 0.00 | 0.00 | 0.00 | 0.00 |
| 145 | 2.00 | 0.00 | 0.00 | 0.00 | 0.00 | 0.00 | 0.00 | 0.00 | 0.00 | 0.00 |
| 146 | 2.00 | 0.00 | 0.00 | 0.00 | 0.00 | 0.00 | 0.00 | 0.00 | 0.00 | 0.00 |
| 147 | 2.50 | 0.00 | 0.00 | 0.00 | 0.00 | 0.00 | 0.00 | 0.00 | 0.00 | 0.00 |
| 148 | 2.00 | 0.00 | 0.00 | 0.00 | 0.00 | 0.00 | 0.00 | 0.00 | 0.00 | 0.00 |
| 149 | 5.00 | 0.00 | 0.00 | 0.00 | 0.00 | 0.00 | 0.00 | 0.00 | 0.00 | 0.00 |
| 150 | 6.00 | 0.00 | 0.00 | 0.00 | 0.00 | 0.00 | 0.00 | 0.00 | 0.00 | 0.00 |
| 151 | 2.00 | 0.05 | 0.00 | 0.00 | 0.00 | 0.00 | 0.00 | 0.00 | 0.00 | 0.05 |
| 152 | 2.00 | 0.10 | 0.00 | 0.00 | 0.00 | 0.00 | 0.00 | 0.00 | 0.00 | 0.10 |
| 153 | 2.00 | 1.00 | 0.00 | 0.00 | 0.00 | 0.00 | 0.00 | 0.00 | 0.00 | 1.00 |
| 154 | 2.00 | 10.00 | 0.00 | 0.00 | 0.00 | 0.00 | 0.00 | 0.00 | 0.00 | 10.00 |
| 155 | 2.00 | 20.00 | 0.00 | 0.00 | 0.00 | 0.00 | 0.00 | 0.00 | 0.00 | 20.00 |
| 156 | 2.00 | 30.00 | 0.00 | 0.00 | 0.00 | 0.00 | 0.00 | 0.00 | 0.00 | 30.00 |
| 157 | 2.00 | 0.00 | 1.00 | 0.00 | 0.00 | 0.00 | 0.00 | 0.00 | 0.00 | 1.00 |
| 158 | 1.00 | 0.00 | 0.00 | 0.00 | 0.00 | 0.00 | 0.00 | 0.00 | 0.00 | 0.00 |
| 159 | 2.00 | 0.00 | 0.00 | 1.00 | 0.00 | 0.00 | 0.00 | 0.00 | 0.00 | 1.00 |
| 160 | 2.00 | 0.00 | 0.00 | 0.00 | 1.00 | 0.00 | 0.00 | 0.00 | 0.00 | 1.00 |
| 161 | 2.00 | 0.00 | 0.00 | 0.00 | 0.00 | 1.00 | 0.00 | 0.00 | 0.00 | 1.00 |
| 162 | 2.00 | 0.00 | 0.00 | 0.00 | 0.00 | 0.00 | 1.00 | 0.00 | 0.00 | 1.00 |
| 163 | 2.00 | 0.00 | 0.00 | 0.00 | 0.00 | 0.00 | 0.00 | 1.00 | 0.00 | 1.00 |
| 164 | 2.00 | 0.00 | 0.00 | 0.00 | 0.00 | 0.00 | 0.00 | 0.00 | 1.00 | 1.00 |
| 165 | 2.00 | 0.00 | 0.00 | 3.00 | 0.00 | 0.00 | 0.00 | 0.00 | 0.00 | 6.00 |
| 166 | 1.00 | 5.00 | 0.00 | 1.00 | 0.00 | 0.00 | 0.00 | 0.00 | 10.00 | 16.05 |
| 167 | 2.00 | 10.00 | 0.00 | 0.00 | 0.00 | 0.00 | 0.00 | 0.00 | 0.00 | 10.00 |
| 168 | 2.00 | 5.00 | 0.00 | 0.00 | 0.00 | 0.00 | 0.00 | 0.00 | 0.00 | 5.00 |
| 169 | 2.00 | 0 | 0 | 0 | 0 | 0 | 0 | 0 | 5.00 | 5.00 |
| 170 | 2.00 | 0 | 0 | 0 | 0 | 0 | 0 | 0 | 0 | 0.00 |
| 171 | 2.00 | 0 | 0 | 0 | 0 | 0 | 0 | 0 | 0 | 0.00 |

TABLE 3-continued

| | | | | | | | | | | | |
|---|---|---|---|---|---|---|---|---|---|---|---|
| 172 | 2.00 | 0 | 0 | 0 | 1.00 | 0 | 0 | 0 | 0 | 0 | 1.00 |
| 173 | 2.00 | 0 | 0 | 0 | 0 | 0 | 0 | 0 | 0 | 0 | 0.00 |
| 174 | 2.00 | 0 | 0 | 0 | 0 | 0 | 0 | 0 | 0 | 0 | 0.00 |
| 175 | 2.00 | 0 | 0 | 0 | 0 | 0 | 0 | 0 | 0 | 0 | 0.00 |

TABLE 4

| Sample No. (*indicates comparative example) | Ge non-existing crystal grain [%] | $C_1/C_2$ [—] | TB type | Specific permittivity 25° C. [—] | Specific resistivity 225° C. [Ω cm] | High temperature accelerated lifetime 250° C. [h] | AC voltage resistance 250° C. [V/μm] |
|---|---|---|---|---|---|---|---|
| 101 | 93 | 34 | ○ | 323 | 1.31E+12 | 645 | 82 |
| 102 | 92 | 45 | ○ | 318 | 1.10E+12 | 617 | 89 |
| 103* | 0 | — | ○ | 266 | 1.07E+12 | 27 | 48 |
| 104* | 87 | 8 | ○ | 262 | 1.08E+12 | 120 | 42 |
| 105 | 92 | 43 | ○ | 316 | 1.19E+12 | 623 | 86 |
| 106 | 91 | 39 | ○ | 321 | 1.28E+12 | 596 | 85 |
| 107 | 98 | 45 | ○ | 318 | 1.12E+12 | 1459 | 84 |
| 108 | 97 | 45 | ○ | 321 | 1.06E+12 | 1483 | 93 |
| 109 | 96 | 41 | ○ | 323 | 1.34E+12 | 1491 | 90 |
| 110 | 92 | 37 | ○ | 316 | 1.39E+12 | 736 | 82 |
| 111 | 98 | 37 | ○ | 330 | 1.31E+12 | 1231 | 95 |
| 112 | 91 | 50 | ○ | 332 | 1.47E+12 | 658 | 80 |
| 113 | 92 | 45 | ○ | 325 | 1.30E+12 | 650 | 93 |
| 114 | 98 | 43 | ○ | 334 | 1.38E+12 | 1403 | 81 |
| 115 | 92 | 38 | ○ | 313 | 1.21E+12 | 640 | 85 |
| 116 | 93 | 39 | ○ | 319 | 1.09E+12 | 664 | 85 |
| 117 | 92 | 35 | ○ | 330 | 1.25E+12 | 611 | 80 |
| 118 | 91 | 54 | ○ | 311 | 1.42E+12 | 637 | 95 |
| 119 | 92 | 48 | ○ | 317 | 1.31E+12 | 614 | 87 |
| 120 | 97 | 55 | ○ | 334 | 1.07E+12 | 1417 | 84 |
| 121 | 92 | 39 | ○ | 321 | 1.40E+12 | 648 | 91 |
| 122 | 94 | 37 | ○ | 330 | 1.25E+12 | 638 | 85 |
| 123 | 92 | 35 | ○ | 331 | 1.46E+12 | 664 | 84 |
| 124 | 97 | 40 | X | 357 | 1.42E+12 | 525 | 76 |
| 125 | 91 | 42 | X | 376 | 1.21E+12 | 510 | 77 |
| 126* | 92 | 33 | X | 278 | 1.01E+11 | 350 | 60 |
| 127 | 94 | 38 | ○ | 333 | 1.33E+12 | 673 | 81 |
| 128 | 93 | 32 | ○ | 335 | 1.12E+12 | 637 | 81 |
| 129 | 92 | 40 | ○ | 325 | 1.27E+12 | 626 | 84 |
| 130 | 97 | 43 | ○ | 319 | 1.16E+12 | 1527 | 87 |
| 131 | 92 | 38 | ○ | 327 | 1.31E+12 | 655 | 80 |
| 132 | 91 | 39 | ○ | 327 | 1.11E+12 | 644 | 83 |
| 133 | 93 | 32 | ○ | 317 | 1.08E+12 | 641 | 80 |
| 134 | 93 | 44 | ○ | 315 | 1.28E+12 | 651 | 83 |
| 135 | 94 | 48 | ○ | 318 | 1.24E+12 | 669 | 84 |
| 136 | 92 | 40 | ○ | 339 | 1.18E+12 | 637 | 89 |
| 137 | 92 | 38 | ○ | 326 | 1.35E+12 | 624 | 83 |
| 138 | 93 | 29 | ○ | 315 | 1.09E+12 | 719 | 85 |
| 139 | 91 | 45 | ○ | 317 | 1.23E+12 | 619 | 80 |
| 140 | 92 | 39 | ○ | 319 | 1.41E+12 | 671 | 82 |
| 141 | 94 | 40 | ○ | 311 | 1.31E+12 | 628 | 83 |
| 142 | 94 | 34 | ○ | 315 | 1.06E+12 | 618 | 87 |
| 143 | 93 | 55 | ○ | 338 | 1.16E+12 | 661 | 81 |
| 144 | 99 | 49 | ○ | 321 | 1.28E+12 | 1331 | 90 |
| 145 | 94 | 45 | ○ | 327 | 1.53E+12 | 613 | 85 |
| 146 | 92 | 39 | ○ | 322 | 1.17E+12 | 628 | 81 |
| 147 | 99 | 44 | ○ | 321 | 1.41E+12 | 1383 | 83 |
| 148 | 92 | 32 | ○ | 327 | 1.22E+12 | 644 | 85 |
| 149 | 93 | 49 | ○ | 316 | 1.44E+12 | 615 | 87 |
| 150 | 93 | 26 | ○ | 328 | 1.13E+12 | 530 | 84 |
| 151 | 92 | 45 | ○ | 317 | 5.20E+12 | 616 | 95 |
| 152 | 92 | 55 | ○ | 329 | 7.02E+12 | 659 | 111 |
| 153 | 99 | 38 | ○ | 318 | 6.36E+12 | 1418 | 106 |
| 154 | 93 | 49 | ○ | 324 | 6.68E+12 | 663 | 108 |
| 155 | 94 | 41 | ○ | 320 | 6.84E+12 | 624 | 125 |
| 156 | 92 | 40 | ○ | 317 | 1.21E+12 | 617 | 96 |
| 157 | 99 | 45 | ○ | 331 | 6.73E+12 | 1530 | 117 |
| 158 | 94 | 26 | ○ | 313 | 1.49E+12 | 564 | 80 |
| 159 | 92 | 54 | ○ | 336 | 6.79E+12 | 675 | 129 |
| 160 | 92 | 56 | ○ | 322 | 6.77E+12 | 633 | 113 |
| 161 | 94 | 45 | ○ | 316 | 7.12E+12 | 666 | 122 |
| 162 | 92 | 36 | ○ | 323 | 6.69E+12 | 625 | 116 |
| 163 | 93 | 42 | ○ | 340 | 6.55E+12 | 655 | 120 |
| 164 | 99 | 49 | ○ | 324 | 6.56E+12 | 1438 | 114 |

TABLE 4-continued

| Sample No. (*indicates comparative example) | Ge non-existing crystal grain [%] | $C_1/C_2$ [—] | TB type | Specific permittivity 25° C. [—] | Specific resistivity 225° C. [Ω cm] | High temperature accelerated lifetime 250° C. [h] | AC voltage resistance 250° C. [V/μm] |
|---|---|---|---|---|---|---|---|
| 165 | 93 | 43 | ○ | 319 | 6.46E+12 | 660 | 123 |
| 166 | 93 | 31 | ○ | 324 | 6.60E+12 | 560 | 108 |
| 167 | 92 | 43 | ○ | 325 | 6.85E+12 | 639 | 117 |
| 168 | 92 | 49 | ○ | 322 | 6.65E+12 | 627 | 115 |
| 169 | 94 | 51 | ○ | 316 | 6.75E+12 | 641 | 112 |
| 170 | 91 | 45 | ○ | 328 | 1.38E+12 | 641 | 82 |
| 171 | 91 | 35 | ○ | 337 | 1.32E+12 | 616 | 87 |
| 172 | 93 | 37 | ○ | 325 | 6.79E+12 | 659 | 113 |
| 173 | 98 | 40 | ○ | 318 | 1.40E+12 | 1461 | 86 |
| 174 | 92 | 43 | ○ | 316 | 1.28E+12 | 622 | 90 |
| 175 | 93 | 48 | ○ | 331 | 1.21E+12 | 669 | 91 |

$C_1/C_2$ of sample No. 103 cannot be calculated because Ge is not included in grain boundary According to the results shown in Table 3 and 4, in case the dielectric composition was made of the crystal grains and the grain boundary occupying between the said crystal grains; and the dielectric composition included the main component, the oxide of Ge (the first sub component), the oxide of V (the second sib component); furthermore the ratio of the crystal grain which substantially does not include Ge was 90% or more, then the specific permittivity at 25° C., the specific resistivity at 225° C., the high temperature accelerated lifetime at 250° C., and the AC voltage resistance at 250° C. were excellent. Also, in case the dielectric composition was made of the crystal grain and the grain boundary occupying between the said crystal grains, and the dielectric composition included the main component, the oxide of Ge (the first sub component), and the oxide of V (the second sib component), furthermore $C_1/C_2$ was 10 or more in terms of mol ratio, then the specific permittivity at 25° C., the specific resistivity at 225° C., the high temperature accelerated lifetime at 250° C., and the AC voltage resistance at 250° C. were excellent.

Also, the multilayer ceramic capacitor sample wherein the content of the oxide of V in terms of V was more than 1.0 mol and 5.0 mol or less, and the content of the oxide Ge was 10.0 mol or more and 17.5 mol or less had particularly excellent high temperature accelerated lifetime at 250° C.

Also, the multilayer ceramic capacitor sample wherein the multilayer ceramic capacitor sample included the second sub component besides the oxide of V in a total of 0.10 mol or more and 20.00 mol or less in terms of each element had particularly excellent specific resistivity at 225° C. and the AC voltage resistance at 250° C.

The embodiments and the examples disclosed herein are merely examples and should not be limited thereto. The scope of the present invention is not the above mentioned embodiments or examples, but it is shown in claims, the present invention includes equivalents of the claims, and includes the modifications and variations within the scope of the present invention.

INDUSTRIAL APPLICABILITY

The dielectric composition of the present invention has high specific permittivity; and the specific resistance, the voltage resistance, and the high temperature accelerated lifetime are particularly high at the high temperature range; thus it is suitable for the environment close to the engine room as the electronic devices mounted to the automobile. Further, it can be suitably used as the electronic devices mounted near the power device using SiC and GaN based semiconductor.

NUMERICAL REFERENCES

1 Multilayer ceramic capacitor
2 Dielectric layer
3 Internal electrode layer
4 External electrode layer
10 Capacitor element body

The invention claimed is:

1. A dielectric composition comprising a main component expressed by a chemical formula of $(A_{6-x}B_xC_{x+2}D_{8-x}O_{30}, 0 \leq x \leq 5)$, wherein
   said "A" component is at least one element selected form the group consisting of Ba, Ca, and Sr,
   said "B" component is at least one element selected from the group consisting of Y, La, Pr, Nd, Sm, Eu, Gd, Tb, Dy, Ho, Er, Tm, Yb, and Lu,
   said "C" component is at least one element selected from the group consisting of Ti, and Zr,
   said "D" component is at least one element selected from the group consisting of Nb, and Ta, and
   said dielectric composition comprises 2.50 mol or more and 20.00 mol or less of an oxide of Ge as a first sub component with respect to 100 mol of said main component.

2. The dielectric composition as set forth in claim 1 comprising 0.10 mol or more and 20.00 mol or less of oxides of at least one element selected from the group consisting of Mn, Mg, V, W, Mo, Si, Li, B, and Al as a second sub component with respect to 100 mol of said main component.

3. A dielectric composition comprising crystal grains and a grain boundary occupying between said crystal grains, wherein
   said crystal grain comprises a compound expressed by $A_{6-x}B_xC_{x+2}D_{8-x}O_{30}$ $(0 \leq x \leq 5)$ as a main component,
   said "A" component is at least one element selected form the group consisting of Ba, Ca, and Sr,
   said "B" component is at least one element selected from the group consisting of Y, La, Pr, Nd, Sm, Eu, Gd, Tb, Dy, Ho, Er, Tm, Yb, and Lu,
   said "C" component is at least one element selected from the group consisting of Ti, and Zr,
   said "D" component is at least one element selected from the group consisting of Nb, and Ta, said dielectric composition comprises an oxide of Ge as a first sub component, and an oxide of V as a second sub component, and a ratio of said crystal grains substantially including Ge is less than 10% with respect to entire said crystal grains.

4. The dielectric composition as set forth in claim 3, wherein when an average concentration of Ge in said grain boundary is $C_1$, and an average concentration of Ge in said crystal grains substantially including Ge is $C_2$, then $C_1/C_2$ is 10 or more in terms of a mol ratio.

5. A dielectric composition comprising crystal grains and a grain boundary occupying between said crystal grains, wherein said crystal grain comprises a compound expressed by $A_{6-x}B_xC_{x+2}D_{8-x}O_{30}$ (0≤x≤5) as a main component, said "A" component is at least one element selected form the group consisting of Ba, Ca, and Sr, said "B" component is at least one element selected from the group consisting of Y, La, Pr, Nd, Sm, Eu, Gd, Tb, Dy, Ho, Er, Tm, Yb, and Lu, said "C" component is at least one element selected from the group consisting of Ti, and Zr, said "D" component is at least one element selected from the group consisting of Nb, and Ta, said dielectric composition comprises an oxide of Ge as a first sub component, and an oxide of V as a second sub component, and when an average concentration of Ge in said grain boundary is $C_1$, and an average concentration of Ge in said crystal grains substantially including Ge is $C_2$, then $C_1/C_2$ is 10 or more in terms of a mol ratio.

6. The dielectric composition as set forth in claim 3, wherein with respect to 100 mol of said main component, a content of said oxide of V is more than 1.0 mol and 5.0 mol or less in terms of V, and a content of said oxide of Ge is 10.0 mol or more and 17.5 mol or less in terms of Ge.

7. The dielectric composition as set forth in claim 5, wherein with respect to 100 mol of said main component, a content of said oxide of V is more than 1.0 mol and 5.0 mol or less in terms of V, and a content of said oxide of Ge is 10.0 mol or more and 17.5 mol or less in terms of Ge.

8. The dielectric composition as set forth in claim 3, wherein said dielectric composition comprises an oxide of at least one element selected from the group consisting of Mn, Mg, W, Mo, Si, Li, B, and Al in addition to the oxide of V as the second sub component, and the content of oxides other than the oxide of V is 0.10 mol or more and 20.00 mol or less in terms of each element.

9. The dielectric composition as set forth in claim 5, wherein said dielectric composition comprises an oxide of at least one element selected from the group consisting of Mn, Mg, W, Mo, Si, Li, B, and Al in addition to the oxide of V as the second sub component, and the content of oxides other than the oxide of V is 0.10 mol or more and 20.00 mol or less in terms of each element.

10. The dielectric composition as set forth in claim 1, wherein said main component has a tungsten-bronze type crystal structure.

11. The dielectric composition as set forth in claim 3, wherein said main component has a tungsten-bronze type crystal structure.

12. The dielectric composition as set forth in claim 5, wherein said main component has a tungsten-bronze type crystal structure.

13. A dielectric element comprising the dielectric composition as set forth in claim 1.

14. A dielectric element comprising the dielectric composition as set forth in claim 3.

15. A dielectric element comprising the dielectric composition as set forth in claim 5.

16. An electronic device comprising a dielectric layer comprising the dielectric composition as set forth in claim 1.

17. An electronic device comprising a dielectric layer comprising the dielectric composition as set forth in claim 3.

18. An electronic device comprising a dielectric layer comprising the dielectric composition as set forth in claim 5.

19. A multilayer electronic device comprising a multilayer part wherein an internal electrode and dielectric layer comprising the dielectric composition as set forth in claim 1 are stacked in an alternating manner.

20. A multilayer electronic device comprising a multilayer part wherein an internal electrode and dielectric layer comprising the dielectric composition as set forth in claim 3 are stacked in an alternating manner.

* * * * *